United States Patent
Urmson et al.

(10) Patent No.: US 12,483,522 B1
(45) Date of Patent: Nov. 25, 2025

(54) NATURAL LANGUAGE COMMUNICATIONS WITH AN AUTONOMOUS VEHICLE

(71) Applicant: Aurora Operations, Inc., Pittsburgh, PA (US)

(72) Inventors: Christopher Paul Urmson, Los Altos, CA (US); Sterling J. Anderson, Sunnyvale, CA (US); James Andrew Bagnell, Pittsburgh, PA (US); Jason Leu, Pittsburgh, PA (US); Colin Mease, Pittsburgh, PA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 19/005,334

(22) Filed: Dec. 30, 2024

Related U.S. Application Data

(63) Continuation of application No. 19/003,447, filed on Dec. 27, 2024.

(60) Provisional application No. 63/738,956, filed on Dec. 26, 2024.

(51) Int. Cl.
   *H04L 51/02* (2022.01)
   *G10L 13/00* (2006.01)
   *H04W 4/40* (2018.01)

(52) U.S. Cl.
   CPC .............. *H04L 51/02* (2013.01); *G10L 13/00* (2013.01); *H04W 4/40* (2018.02)

(58) Field of Classification Search
   CPC ........... H04L 51/02; G10L 13/00; H04W 4/40
   See application file for complete search history.

(56) References Cited

U.S. PATENT DOCUMENTS

2025/0068885 A1* 2/2025 Poupyrev ................ G06F 40/40

FOREIGN PATENT DOCUMENTS

WO WO-2015112752 A1 * 7/2015 ......... G01C 21/3626

* cited by examiner

*Primary Examiner* — Soe Hlaing
(74) *Attorney, Agent, or Firm* — Gray Ice Higdon

(57) ABSTRACT

Implementations described herein relate to enabling natural language communications with an autonomous vehicle. In some implementations, processor(s) of a system can initiate and conduct a conversation with a remote communication participant that is located remotely from the autonomous vehicle whereas, in additional or alternative implementations, the processor(s) can answer an incoming electronic communication and conduct a conversation with a remote communication participant that is located remotely from the autonomous vehicle. In other additional or alternative implementations, the processor(s) can also conduct conversations with a local communication participant that is located proximate to the autonomous vehicle. Notably, the processor(s) can be implemented locally at the autonomous vehicle or remotely from the autonomous vehicle (e.g., at a remote server).

27 Claims, 15 Drawing Sheets

NATURAL LANGUAGE COMMUNICATIONS WITH AN AUTONOMOUS VEHICLE

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate map data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, making and implementing decisions to appropriately control the vehicle given the current environment within which the vehicle is operating, and conveying this information and these decisions to various parties that have an interest in the vehicle. The various parties that have an interest in the vehicle can include, for example, a dispatcher that dispatches the vehicle or a fleet of vehicles, a teleassist operator that can remotely control the vehicle in certain scenarios, a shipper that owns or controls a payload of the vehicle in instances where the vehicle is an autonomous tractor-trailer, a carrier associated with a trailer of the vehicle in instances where the vehicle is an autonomous tractor-trailer, and so on. Therefore, continuing efforts are being made to improve each of these aspects, and by doing so, autonomous vehicles increasingly are able to reliably handle a wider variety of situations and communicate this information and these decisions about different situations to the various parties that have an interest in the vehicle.

One particular challenge in communicating information about these situations to the various parties that have an interest in the vehicle, for example, results from the inherently dynamic environment within which autonomous vehicles are expected to operate and a vast quantity of sensor data that is being generated and processed by the vehicle. For example, many autonomous vehicles may process this sensor data to continue operating in an autonomous manner. However, these autonomous vehicles may not know what sensor data that, when detected, should result in initiating communications with one or more of the various parties that have an interest in the vehicle, may not know which of these various parties that have an interest in the vehicle to initiate communications with, and/or may not have the ability to engage in communications using natural language. Also, for example, non-autonomous vehicles may rely on a human driver to perceive data to continue operating in a non-autonomous manner. However, the human driver may not perceive certain data that, when detected, should result in initiating communications with one or more of the various parties that have an interest in the vehicle. Further, even if the human driver does perceive this certain data, initiating communications with one or more of the various parties may distract the human driver, thereby creating a hazard for the human driver and/or other vehicles on the road. Accordingly, in these and other situations, there is a need for determining when to initiate these communications and/or determining with whom to initiate these communications.

Another particular challenge in communicating information about these situations to the various parties that have an interest in the vehicle, for example, results from data security concerns in situations in which the vehicle (or a human driver of the vehicle) is capable of communicating using natural language. For example, assuming an autonomous vehicle is capable of communicating using natural language, humans may attempt to engage in communications with the autonomous vehicle for nefarious purposes. For instance, a human could engage in communications with the autonomous vehicle and attempt to re-route the autonomous vehicle, attempt to have the autonomous vehicle reveal a payload of the autonomous vehicle, and/or perform other nefarious actions. Also, for example, assuming a non-autonomous vehicle is operated by a human driver, the human driver may be susceptible to being duped by these other humans that are communicating with the human driver for nefarious purposes. Accordingly, in these and other situations, there is a need for authenticating the human to ensure they are authorized to cause such actions to be performed and/or to obtain such information.

Yet another particular challenge in communicating information about these situations to the various parties that have an interest in the vehicle, for example, results in some humans periodically needing to access the vehicle. For example, assuming an autonomous vehicle is capable of communicating using natural language, humans may need to access the autonomous vehicle or component(s) thereof (e.g., under a hood of the autonomous vehicle, an interior of the autonomous vehicle, a glove box of the autonomous vehicles, etc.). For instance, an autonomous vehicle may need to re-fuel, visit a weigh station (e.g., if the autonomous vehicle is an autonomous tractor-trailer), or otherwise engage in communications with humans that are locationally proximate to the autonomous vehicle, but do not have means for doing so. Accordingly, in these and other situations, there is a need for authenticating the human to ensure they are authorized to access the autonomous vehicle or the component(s) thereof.

SUMMARY

The present disclosure is related to autonomous vehicle communication systems and methods that allow various different parties to engage in natural language communications with an autonomous vehicle.

Therefore, consistent with one aspect of the present disclosure, a method implemented by one or more processors is provided and includes: monitoring sensor data associated with an autonomous vehicle or an environment of the autonomous vehicle, the sensor data being generated by one or more sensors of the autonomous vehicle; determining, based on an instance of the sensor data, whether to initiate a conversation with a remote communication participant that is located remotely from the autonomous vehicle; and in response to determining to initiate the conversation with the remote communication participant that is located remotely from the autonomous vehicle and based on the instance of the sensor data: initiating the conversation with the remote communication participant; and conducting the conversation with the remote communication participant. Conducting the conversation with the remote communication participant may include: processing, using a generative model, generative model input to generate generative model output, the generative model input including at least an indication of the instance of the sensor data; determining, based on the generative model output, content to be rendered as part of the conversation with the remote communication participant; and causing the content to be rendered at a computing device associated with the remote communication participant.

By using technical solutions described in the present disclosure, one or more technical advantages can be achieved. For example, by using the generative model, the processor(s) can engage in natural language communications with the remote communication participant to relay information about the autonomous vehicle to the remote communication participant or answer questions about the autonomous vehicle from the remote communication participant, relay information about future plans of the autonomous vehicle to the remote communication participant or answer questions about the future plans of the autonomous vehicle from the remote communication participant, relay information about a fleet of autonomous vehicles or future plans of the fleet of autonomous vehicles to the remote communication participant or answer questions about the fleet of autonomous vehicles or future plans of the fleet of autonomous vehicles from the remote communication participant, relay information about the environment to the remote communication participant or answer questions above the environment of the autonomous vehicle from the remote communication participant, relay information about events encountered by the autonomous vehicle to the remote communication participant or answer questions about events encountered by the autonomous vehicle from the remote communication participant, etc. In some implementations, this is based on the generative model leveraging structured data as described herein that was previously generated and stored in one or more databases. Further, by monitoring the sensor data associated with the autonomous vehicle or the environment of the autonomous vehicle, the processor(s) can intelligently determine whether and/or when to initiate the conversation with the remote communication participant. Absent utilization of the instance of the sensor data to determine whether and/or when to initiate the conversation with the remote communication participant, the processor(s) may over trigger or under trigger initiation of natural language communications, thereby unnecessarily wasting computational and/or network resources. Moreover, and based on the instance of the sensor data which triggers the processor(s) to initiate the conversation with the remote communication participant, the processor(s) can intelligently determine to initiate the conversation with the appropriate party. Absent utilization of the instance of the sensor data to determine the remote communication participant to engage in the conversation with, the processor(s) may initiate and conduct conversations with the wrong party, thereby unnecessarily wasting computational and/or network resources.

These and other implementations of technology disclosed herein can optionally include one or more of the following features.

In some implementations, the method can further include: determining a type of the instance of the sensor data, the type of the instance of the sensor data being one of multiple disparate types of instances of the sensor data; and identifying, based on the type of the instance of the sensor data, the remote communication participant that is located remotely from the autonomous vehicle.

In some versions of those implementations, the type of the instance of the sensor data can be a first type of sensor data, and the remote communication participant can be a dispatcher associated with the autonomous vehicle. In additional or alternative versions of those implementations, the type of the instance of the sensor data can be a second type of sensor data, and the remote communication participant can be a teleassist operator associated with the autonomous vehicle. In additional or alternative versions of those implementations, the autonomous vehicle can be an autonomous tractor-trailer, the type of the instance of the sensor data can be a third type of sensor data, and the remote communication participant can be a shipper associated with a payload of a trailer of the autonomous tractor-trailer. In additional or alternative versions of those implementations, the autonomous vehicle can be an autonomous tractor-trailer, the type of the instance of the sensor data can be a fourth type of sensor data, and the remote communication participant can be a carrier associated with a trailer of the autonomous tractor-trailer.

In some implementations, initiating the conversation with the remote communication participant can include: obtaining a telephone number associated with the remote communication participant; and initiating, based on the telephone number associated with the remote communication participant, a telephone call with the remote communication participant over a telephonic network.

In some implementations, conducting the conversation with the remote communication participant can further include: receiving audio data that captures additional content spoken by the remote communication participant, the audio data being generated by one or more microphones of the computing device associated with the remote communication participant; processing, using the generative model, additional generative model input to generate additional generative model output, the additional generative model input including at least an indication of the additional content spoken by the remote communication participant; determining, based on the additional generative model output, further additional content to be rendered as part of the conversation with the remote communication participant; and causing the further additional content to be rendered at the computing device associated with the remote communication participant.

In some versions of those implementations, the method can further include: determining, based on the additional content spoken by the remote communication participant, whether to obtain contextual autonomous vehicle data for utilization in generating the further additional content; and in response to determining to obtain the contextual autonomous vehicle data for utilization in generating the further additional content: obtaining, from one or more structured databases that include structured data, the contextual autonomous vehicle data. In some further versions of those implementations, the structured data can be previously generated based on one or more of: historical driving logs of the autonomous vehicle or one or more additional autonomous vehicles in a fleet of autonomous vehicles with at least the autonomous vehicle, historical conversation logs associated with the remote communication participant, historical sensor data generated by the one or more sensors of the autonomous vehicle or one or more of the additional autonomous vehicles, and historical maintenance data associated with the autonomous vehicle or one or more of the additional autonomous vehicles. In additional or alternative further versions of those implementations, the additional generative model input can further include the contextual autonomous vehicle data.

In some implementations, the method can further include, in response to determining to refrain from initiating the conversation with the remote communication participant that is located remotely from the autonomous vehicle and based on the instance of the sensor data: continuing monitoring of the sensor data associated with the autonomous vehicle.

In some versions of those implementations, the method can further include: determining, based on an additional instance of the sensor data that is in addition to the instance of sensor, whether to initiate a conversation with a remote communication participant that is located remotely from the autonomous vehicle; and in response to determining to initiate the conversation with the remote communication participant that is located remotely from the autonomous vehicle and based on the additional instance of the sensor data: initiating the conversation with the remote communication participant; and conducting the conversation with the remote communication participant. Conducting the conversation with the remote communication participant can include: processing, using a generative model, generative model input to generate generative model output, the generative model input including at least an indication of the instance of the sensor data; determining, based on the generative model output, content to be rendered as part of the conversation with the remote communication participant; and causing the content to be rendered at a computing device associated with the remote communication participant.

In some implementations, the one or more processors can be local to the autonomous vehicle. In some versions of those implementations, corresponding instances of the sensor data can be monitored as they are generated by the one or more sensors of the autonomous vehicle.

In some implementations, the one or more processors can be located remotely from the autonomous vehicle, and the one or more processors can be located remotely from the computing device associated with the remote communication participant. In some versions of those implementations, monitoring the sensor data associated with the autonomous vehicle or the environment of the autonomous vehicle can include: receiving, over one or more networks, corresponding instances of the sensor data. The corresponding instances of the sensor data can be generated at a first rate, and the corresponding instances of the sensor data can be received at a second rate that differs from the first rate.

In some implementations, the method can further include: determining a result of the conversation with the remote communication participant; determining, based on the result of the conversation with the remote communication participant, whether to initiate an additional conversation with an additional remote communication participant that is located remotely from the autonomous vehicle; and in response to determining to initiate an additional conversation with an additional remote communication participant that is located remotely from the autonomous vehicle: initiating the additional conversation with the additional remote communication participant; and conducting the additional conversation with the additional remote communication participant. Conducting the additional conversation with the additional remote communication participant can include: processing, using the generative model, additional generative model input to generate additional generative model output, the additional generative model input including at least an indication of the result of the conversation with the remote communication participant; determining, based on the additional generative model output, additional content to be rendered as part of the additional conversation with the additional remote communication participant; and causing the additional content to be rendered at an additional computing device associated with the additional remote communication participant.

In some implementations, causing the content to be rendered at the computing device associated with the remote communication participant can include: causing the content to be audibly rendered via one or more speaker components of the computing device associated with the remote communication participant.

In some implementations, causing the content to be rendered at the computing device associated with the remote communication participant can include: causing the content to be visually rendered via a display of the computing device associated with the remote communication participant.

In some implementations, the method can further include: determining, based on the instance of the sensor data, one or more structured database queries to obtain contextual autonomous vehicle data; and obtaining, from one or more structured databases that include structured data, and based on the one or more structured database queries, the contextual autonomous vehicle data. The generative model input can further include the contextual autonomous vehicle data. In some versions of those implementations, determining the one or more structured database queries to obtain the contextual autonomous vehicle data can be in response to determining to initiate the conversation with the remote communication participant that is located remotely from the autonomous vehicle and based on the instance of the sensor data.

In some implementations, the generative model input can further include contextual autonomous vehicle data that is specific to the autonomous vehicle, and the contextual autonomous vehicle data that is specific to the autonomous vehicle can include one or more of: conversation logs associated with the autonomous vehicle, historical sensor data associated with the autonomous vehicle, maintenance logs associated with the autonomous vehicle, event logs associated with the autonomous vehicle, dispatch records associated with the autonomous vehicle; or operational logs associated with the autonomous vehicle. In some versions of those implementations, the contextual autonomous vehicle data can be obtained prior to determining to initiate the conversation with the remote communication participant that is located remotely from the autonomous vehicle and based on the instance of the sensor data. In additional or alternative versions of those implementations, the contextual autonomous vehicle data can be specific to the autonomous vehicle for a current episode of locomotion of the autonomous vehicle.

Consistent with another aspect of the present disclosure, a method implemented by one or more processors is provided and includes: receiving an incoming electronic communication directed to an autonomous vehicle, the incoming electronic communication being initiated by a remote communication participant that is located remotely from the autonomous vehicle; and in response to receiving the incoming electronic communication directed to the autonomous vehicle: conducting a conversation with the remote communication participant. Conducting the conversation with the remote communication participant includes: processing, using a generative model, instances of generative model input to generate instances of generative model output; determining, based on the instances of generative model output, instances of content to be rendered as part of the conversation with the remote communication participant; and causing the instances of content to be rendered at a computing device associated with the remote communication participant.

By using technical solutions described in the present disclosure, one or more technical advantages can be achieved. For example, by using the generative model, the processor(s) can engage in natural language communications with the remote communication participant to relay information about the autonomous vehicle to the remote communication participant or answer questions about the autonomous vehicle from the remote communication participant, relay information about future plans of the autonomous vehicle to the remote communication participant or answer questions about the future plans of the autonomous vehicle from the remote communication participant, relay information about a fleet of autonomous vehicles or future plans of the fleet of autonomous vehicles to the remote communication participant or answer questions about the fleet of autonomous vehicles or future plans of the fleet of autonomous vehicles from the remote communication participant, relay information about the environment to the remote communication participant or answer questions above the environment of the autonomous vehicle from the remote communication participant, relay information about events encountered by the autonomous vehicle to the remote communication participant or answer questions about events encountered by the autonomous vehicle from the remote communication participant, etc. In some implementations, this is based on the generative model leveraging structured data as described herein that was previously generated and stored in one or more databases. Further, by engaging in the conversation with the remote communication participant that initiated the incoming electronic communication, the processor(s) can authenticate the remote communication participant, and optionally grant access to and/or restrict access portion(s) of the aforementioned structured data. Absent engaging in the conversation and authenticating the remote communication participant, the autonomous vehicle may be susceptible to nefarious actions, thereby compromising data security of the autonomous vehicle and/or a payload of the autonomous vehicle.

These and other implementations of technology disclosed herein can optionally include one or more of the following features.

In some implementations, an initial instance of the generative model input, of the instances of generative model input, can include at least a prompt for authenticating the remote communication participant, and an initial instance of the content, of the instances of content, that is determined based on an initial instance of the generative model output, of the instances of generative model output, can include a request to authenticate the remote communication participant.

In some versions of those implementations, the request to authenticate the remote communication participant can request that the remote communication participant complete one or more of: short message service token authentication, email token authentication, hardware token authentication, software token authentication, biometric authentication, password authentication, or personal identification number authentication.

In additional or alternative versions of those implementations, subsequent instances of the generative model input, of the instances of the generative model input, can be dynamically determined based on at least a type of the remote communication participant, and the type of the remote communication participant can be one of: a dispatcher associated with the autonomous vehicle, a teleassist operator associated with the autonomous vehicle, a shipper associated with a payload the autonomous vehicle, or a carrier associated with a trailer of the autonomous vehicle.

In further versions of those additional or alternative implementations, the method can further include, in response to determining that the type of the remote communication participant is the dispatcher associated with the autonomous vehicle or the teleassist operator associated with the autonomous vehicle: authorizing access to all contextual autonomous vehicle data that is specific to the autonomous vehicle for inclusion in the subsequent instances of the generative model input.

In some further versions of those additional or alternative implementations, the method can further include, as part of the conversation: receiving audio data that captures additional content spoken by the remote communication participant, the audio data being generated by one or more microphones of the computing device associated with the remote communication participant; obtaining, from one or more structured databases that include structured data, and based on the additional content spoken by the remote communication participant, one or more portions of the contextual autonomous vehicle data; processing, using the generative model, a given subsequent instance of the generative model input, of the instances of the generative model input, to generate a given subsequent instance of the generative model output, of the instances of the generative model output, the given subsequent instance of the generative model input including at least an indication of the additional content spoken by the remote communication participant and the one or more portions of the contextual autonomous vehicle data; determining, based on the given subsequent instance of the generative model output, a given additional instance of the content, of the instances of the content, to be rendered as part of the conversation with the remote communication participant; and causing the given additional instance of the content to be rendered at the computing device associated with the remote communication participant.

In some further versions of those additional or alternative implementations, the method can further include, as part of the conversation: receiving audio data that captures additional content spoken by the remote communication participant, the audio data being generated by one or more microphones of the computing device associated with the remote communication participant; processing, using the generative model, a given subsequent instance of the generative model input, of the instances of the generative model input, to generate a given subsequent instance of the generative model output, of the instances of the generative model output, the given subsequent instance of the generative model input including at least an indication of the additional content spoken by the remote communication participant and the contextual autonomous vehicle data; determining, based on the given subsequent instance of the generative model output, a given additional instance of the content, of the instances of the content, to be rendered as part of the conversation with the remote communication participant; and causing the given additional instance of the content to be rendered at the computing device associated with the remote communication participant.

In some further versions of those additional or alternative implementations, the method can further include, in response to determining that the type of the remote communication participant is the shipper associated with the payload of the autonomous vehicle: authorizing access to only a first subset of the contextual autonomous vehicle data, that includes less than all of the contextual autonomous vehicle data, for inclusion in the subsequent instances of the generative model input.

In yet further versions of those additional or alternative implementations, the method can further include, as part of the conversation: receiving audio data that captures additional content spoken by the remote communication participant, the audio data being generated by one or more microphones of the computing device associated with the remote communication participant; obtaining, from one or more structured databases that include structured data, and based on the additional content spoken by the remote communication participant, one or more portions of the first subset of the contextual autonomous vehicle data; processing, using the generative model, a given subsequent instance of the generative model input, of the instances of the generative model input, to generate a given subsequent instance of the generative model output, of the instances of the generative model output, the given subsequent instance of the generative model input including at least an indication of the additional content spoken by the remote communication participant and the one or more portions of the first subset of the contextual autonomous vehicle data; determining, based on the given subsequent instance of the generative model output, a given additional instance of the content, of the instances of the content, to be rendered as part of the conversation with the remote communication participant; and causing the given additional instance of the content to be rendered at the computing device associated with the remote communication participant.

In other yet further versions of those additional or alternative implementations, the method can further include, as part of the conversation: receiving audio data that captures additional content spoken by the remote communication participant, the audio data being generated by one or more microphones of the computing device associated with the remote communication participant; processing, using the generative model, a given subsequent instance of the generative model input, of the instances of the generative model input, to generate a given subsequent instance of the generative model output, of the instances of the generative model output, the given subsequent instance of the generative model input including at least an indication of the additional content spoken by the remote communication participant and the first subset of the contextual autonomous vehicle data; determining, based on the given subsequent instance of the generative model output, a given additional instance of the content, of the instances of the content, to be rendered as part of the conversation with the remote communication participant; and causing the given additional instance of the content to be rendered at the computing device associated with the remote communication participant.

In other further versions of those additional or alternative implementations, the method can further include, in response to determining that the type of the remote communication participant is the carrier associated with the trailer of the autonomous vehicle: authorizing access to only a second subset of the contextual autonomous vehicle data, that includes less than all of the contextual autonomous vehicle data and that differs from the first subset of the contextual autonomous vehicle data, for inclusion in the subsequent instances of the generative model input.

In yet further versions of those additional or alternative implementations, the method can include, as part of the conversation: receiving audio data that captures additional content spoken by the remote communication participant, the audio data being generated by one or more microphones of the computing device associated with the remote communication participant; obtaining, from one or more structured databases that include structured data, and based on the additional content spoken by the remote communication participant, one or more portions of the second subset of the contextual autonomous vehicle data; processing, using the generative model, a given subsequent instance of the generative model input, of the instances of the generative model input, to generate a given subsequent instance of the generative model output, of the instances of the generative model output, the given subsequent instance of the generative model input including at least an indication of the additional content spoken by the remote communication participant and the one or more portions of the second subset of the contextual autonomous vehicle data; determining, based on the given subsequent instance of the generative model output, a given additional instance of the content, of the instances of the content, to be rendered as part of the conversation with the remote communication participant; and causing the given additional instance of the content to be rendered at the computing device associated with the remote communication participant.

In other yet further versions of those additional or alternative implementations, the method can include, as part of the conversation: receiving audio data that captures additional content spoken by the remote communication participant, the audio data being generated by one or more microphones of the computing device associated with the remote communication participant; processing, using the generative model, a given subsequent instance of the generative model input, of the instances of the generative model input, to generate a given subsequent instance of the generative model output, of the instances of the generative model output, the given subsequent instance of the generative model input including at least an indication of the additional content spoken by the remote communication participant and the second subset of the contextual autonomous vehicle data; determining, based on the given subsequent instance of the generative model output, a given additional instance of the content, of the instances of the content, to be rendered as part of the conversation with the remote communication participant; and causing the given additional instance of the content to be rendered at the computing device associated with the remote communication participant.

In other further versions of those additional or alternative implementations, the contextual autonomous vehicle data can include one or more of: conversation logs associated with the autonomous vehicle, historical sensor data associated with the autonomous vehicle, maintenance logs associated with the autonomous vehicle, event logs associated with the autonomous vehicle, dispatch records associated with the autonomous vehicle; or operational logs associated with the autonomous vehicle.

In yet other further versions of those additional or alternative implementations, the subsequent instances of the generative model input, of the instances of the generative model input, can be dynamically determined based on instances of additional content provided by the remote communication participant.

In some implementations, the one or more processors can be local to the autonomous vehicle. In other implementations, the one or more processors can be located remotely from the autonomous vehicle, and the one or more processors can be located remotely from the computing device associated with the remote communication participant.

In some implementations, causing the content to be rendered at the computing device associated with the remote communication participant can include: causing one or more of the instances of the content to be audibly rendered via one or more speaker components of the computing device associated with the remote communication participant.

In some implementations, causing the content to be rendered at the computing device associated with the remote communication participant can include: causing one or more of the instances of the content to be visually rendered via a display of the computing device associated with the remote communication participant.

In some implementations, the method can further include: determining a result of the conversation with the remote communication participant; determining, based on the result of the conversation with the remote communication participant, to modify control of the autonomous vehicle; and causing the control of the autonomous vehicle to be modified based on the result of the conversation with the remote communication participant.

In some implementations, the incoming electronic communication can be one of: an incoming telephone call, or an incoming text-based communication.

In some implementations, the method can further include, as part of the conversation: determining whether the remote communication participant is authorized to engage in the conversation; and in response to determining that the remote communication participant is authorized to engage in the conversation: continuing the conversation with the remote communication participant.

In some further versions of those implementations, the method can further include, in response to determining that the remote communication participant is not authorized to engage in the conversation: terminating the conversation with the remote communication participant; and causing an onboard configuration update to be performed at the autonomous vehicle.

In yet further versions of those implementations, the method can further include transmitting, to one or more additional autonomous vehicles in a fleet of autonomous vehicles with the autonomous vehicle, a message that, when received by the one or more additional autonomous vehicles, cause the one or more additional autonomous vehicles to perform a corresponding onboard configuration update.

Consistent with another aspect of the present disclosure, a method implemented by one or more processors is provided and includes: monitoring sensor data associated with an autonomous vehicle or an environment of the autonomous vehicle, the sensor data being generated by one or more sensors of the autonomous vehicle; determining, based on an instance of the sensor data, whether to initiate a conversation with a local communication participant that is located proximate to the autonomous vehicle and that is attempting to access the autonomous vehicle or a component of the autonomous vehicle; and in response to determining to initiate the conversation with the local communication participant that is located proximate to the autonomous vehicle and that is attempting to access the autonomous vehicle or the component of the autonomous vehicle: initiating the conversation with the local communication participant; and conducting the conversation with the local communication participant. Conducting the conversation with the local communication participant includes: processing, using a generative model, instances of generative model input to generate instances of generative model output; determining, based on the instances of generative model output, instances of content to be rendered as part of the conversation with the remote communication participant; and causing the instances of content to be rendered at a computing device of the autonomous vehicle or an additional computing device associated with the local communication participant.

By using technical solutions described in the present disclosure, one or more technical advantages can be achieved. For example, by using the generative model, the processor(s) can engage in natural language communications with the local communication participant to relay information about the autonomous vehicle to the local communication participant or answer questions about the autonomous vehicle from the local communication participant, relay information about the environment to the local communication participant or answer questions above the environment of the autonomous vehicle from the local communication participant, relay information about events encountered by the autonomous vehicle to the local communication participant or answer questions about events encountered by the autonomous vehicle from the local communication participant, etc. In some implementations, this is based on the generative model leveraging structured data as described herein that was previously generated and stored in one or more databases. Further, by engaging in the conversation with the local communication participant, the processor(s) can authenticate the local communication participant, and optionally grant access to and/or restrict access portion(s) of the aforementioned structured data. Absent engaging in the conversation and authenticating the local communication participant, the autonomous vehicle may be susceptible to nefarious actions, thereby compromising data security of the autonomous vehicle and/or a payload of the autonomous vehicle.

These and other implementations of technology disclosed herein can optionally include one or more of the following features.

In some implementations, an initial instance of the generative model input, of the instances of generative model input, can include at least a prompt for authenticating the remote communication participant, and an initial instance of the content, of the instances of content, that is determined based on an initial instance of the generative model output, of the instances of generative model output, can include a request to authenticate the remote communication participant.

In some versions of those implementations, the request to authenticate the local communication participant can request that the local communication participant complete one or more of: short message service token authentication, email token authentication, hardware token authentication, software token authentication, biometric authentication, password authentication, or personal identification number authentication.

In additional or alternative versions of those implementations, the method can further include: determining, based on the conversation, whether the local communication participant is authorized to access the autonomous vehicle or the component of the autonomous vehicle; and in response to determining that the local communication participant is authorized to access the autonomous vehicle or the component of the autonomous vehicle: granting the local communication participant access to the autonomous vehicle or the component of the autonomous vehicle.

In some further versions of those additional or alternative implementations, the method can further include: determining, based on the conversation, whether the local communication participant is authorized to access the autonomous vehicle or the component of the autonomous vehicle; and in response to determining that the local communication participant is not authorized to access the autonomous vehicle or the component of the autonomous vehicle: refraining from granting the local communication participant access to the autonomous vehicle or the component of the autonomous vehicle.

In additional or alternative versions of those implementations, one or more subsequent instances of the generative model input, of the instances of the generative model input, can be dynamically determined based on instances of additional content provided by the local communication participant.

In some implementations, the one or more processors can be local to the autonomous vehicle. In other implementations, the one or more processors can be located remotely from the autonomous vehicle, and where the one or more processors are located remotely from the additional computing device associated with the local communication participant.

In some implementations, causing the content to be rendered at the computing device of the autonomous vehicle or the additional computing device associated with the local communication participant can include: causing one or more of the instances of the content to be audibly rendered via one or more speaker components of the computing device of the autonomous vehicle or the additional computing device associated with the local communication participant.

In some implementations, causing the content to be rendered at the computing device of the autonomous vehicle or the additional computing device associated with the local communication participant can include: causing one or more of the instances of the content to be visually rendered via a display of the computing device of the autonomous vehicle or the additional computing device associated with the local communication participant.

In some implementations, the local communication participant may be attempting to access the autonomous vehicle.

In some implementations, the local communication participant may be attempting to access the component of the autonomous vehicle, and the component of the autonomous vehicle can be one of: under the hood of the autonomous vehicle, a gas tank of the autonomous vehicle, a trailer hitch of the autonomous vehicle, a glove compartment of the autonomous vehicle, a lockbox of the autonomous vehicle, a cabin of the autonomous vehicle, or a storage compartment of the autonomous vehicle.

In addition, some implementations include systems having at least one processor (e.g., central processing unit(s) (CPU(s)), graphics processing unit(s) (GPU(s), and/or tensor processing unit(s) (TPU(s)) of one or more computing devices, where the at least one processor is operable to execute instructions stored in associated memory, and where the instructions are configured to execute any of the afore- mentioned methods. Some implementations also include one or more non-transitory computer readable storage media storing computer instructions executable by at least one processor to perform any of the aforementioned methods. Some implementations also include a computer program product including instructions executable by at least one processor to perform any of the aforementioned methods. Some implementations also include an autonomous vehicle and/or a system that is remotely located from the autonomous vehicle and includes at least one processor that is operable to execute instructions stored in associated memory, and where the instructions are configured to execute any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

The various implementations discussed hereinafter are generally directed to enabling natural language communications with an autonomous vehicle. In some implementations, processor(s) of a system can initiate and conduct a conversation with a remote communication participant that is located remotely from the autonomous vehicle whereas, in additional or alternative implementations, the processor(s) can answer an incoming electronic communication and conduct a conversation with a remote communication participant that is located remotely from the autonomous vehicle. In other additional or alternative implementations, the processor(s) can also conduct conversations with a local communication participant that is located proximate to the autonomous vehicle. Notably, the processor(s) can be implemented locally at the autonomous vehicle or remotely from the autonomous vehicle (e.g., at a remote server).

Figure 1:
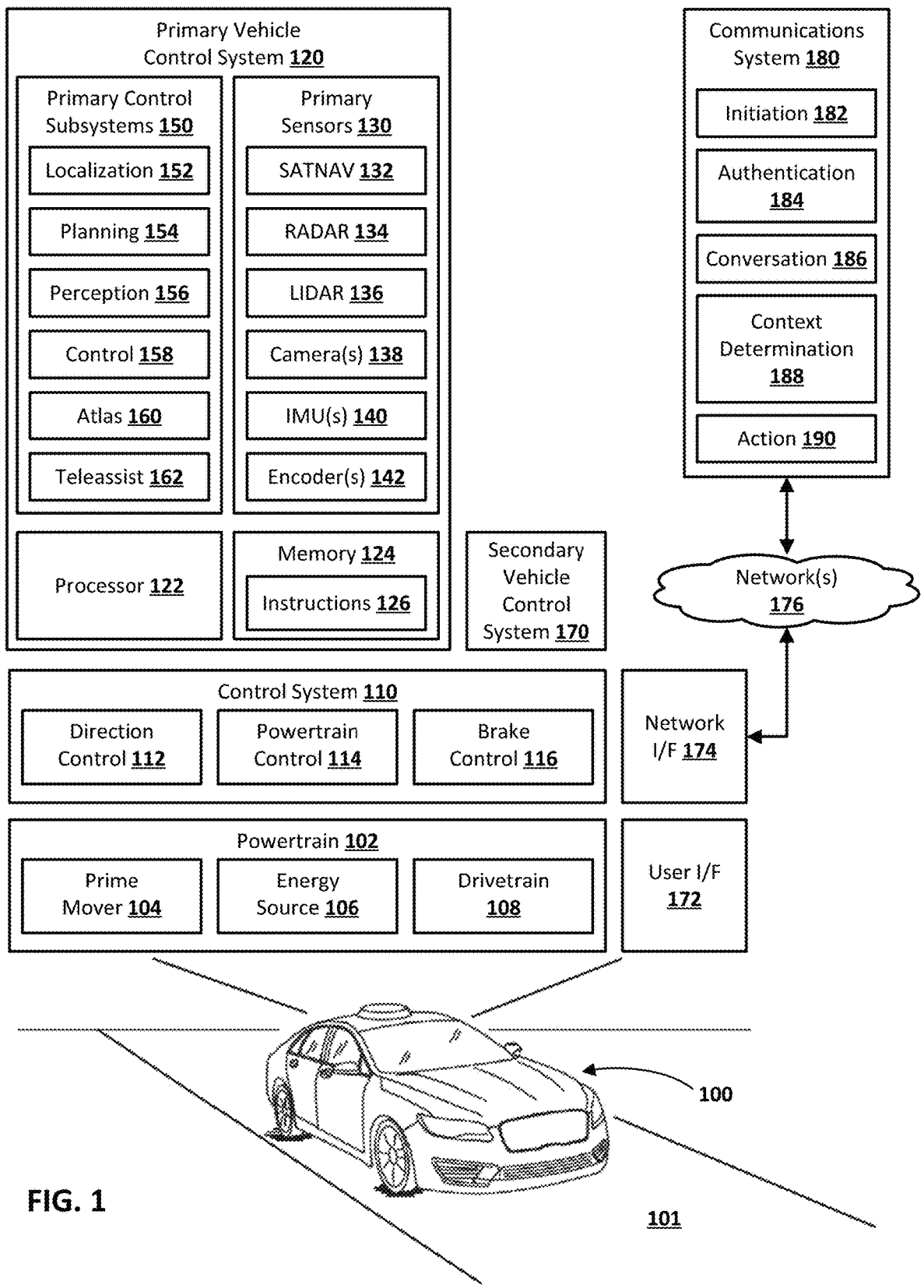
FIG. 1 depicts an example hardware and software environment for an autonomous vehicle.

Turning now to FIG. 1, an example autonomous vehicle 100 within which the various techniques disclosed herein may be implemented is depicted. Vehicle 100, for example, is shown driving on a road 101, and vehicle 100 may include a powertrain 102 including a prime mover 104 powered by an energy source 106 and capable of providing power to a drivetrain 108, as well as a control system 110 including a direction control 112, a powertrain control 114 and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized. In addition, vehicle 100 may be considered to be an "ego vehicle" from the perspective of its operation and control, with other vehicles in the surrounding environment (which may be autonomous vehicles or non-autonomous vehicles) considered to be "non-ego vehicles" relative to the autonomous/ego vehicle.

The implementations discussed hereinafter, for example, will focus on a wheeled land vehicle such as a car, van, truck, tractor-trailer, bus, etc. In such implementations, the prime mover 104 may include one or more electric motors and/or an internal combustion engine (among others), while energy source 106 may include a fuel system (e.g., providing gasoline, diesel, hydrogen, etc.), a battery system, solar panels or other renewable energy source, a fuel cell system, etc., and drivetrain 108 may include wheels and/or tires along with a transmission and/or any other mechanical drive components suitable for converting the output of prime mover 104 into vehicular motion, as well as one or more brakes configured to controllably stop or slow the vehicle and direction or steering components suitable for controlling the trajectory of the vehicle (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used, e.g., in the case of electric/gas hybrid vehicles, and in some instances multiple electric motors (e.g., dedicated to individual wheels or axles) may be used as a prime mover. In the case of a hydrogen fuel cell implementation, the prime mover may include one or more electric motors, and the energy source may include a fuel cell system powered by hydrogen fuel.

Direction control 112 may include one or more actuators and/or sensors for controlling and receiving feedback from the direction or steering components to enable the vehicle to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle. Brake control 116 may be configured to control one or more brakes that slow or stop vehicle 100, e.g., disk or drum brakes coupled to the wheels of the vehicle.

Other vehicle types, including but not limited to off-road vehicles, all-terrain or tracked vehicles, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations, some of the components may be combined, e.g., where directional control of a vehicle is primarily handled by varying an output of one or more prime movers. Therefore, the herein-described techniques are not limited to an autonomous wheeled land vehicle.

In the illustrated implementation, autonomous control over vehicle 100 (which may include various degrees of autonomy as well as selective autonomous functionality) is primarily implemented in a primary vehicle control system 120, which may include one or more processors 122 and one or more memories 124, with each processor 122 configured to execute program code instructions 126 stored in a memory 124.

A primary sensor system 130 may include various sensors suitable for collecting information from a vehicle's surrounding environment for use in controlling the operation of the vehicle. For example, a satellite navigation (SATNAV) sensor 132, e.g., compatible with any of various satellite navigation systems such as GPS, GLONASS, Galileo, Compass, etc., may be used to determine the location of the vehicle on the Earth using satellite signals. Radio Detection and Ranging (RADAR) and Light Detection and Ranging (LIDAR) sensors 134, 136, as well as one or more digital cameras 138 (which may include various types of image capture devices capable of capturing still and/or video imagery), may be used to sense stationary and moving objects within the immediate vicinity of a vehicle. One or more inertial measurement units (IMU(s)) 140 may include multiple gyroscopes and accelerometers capable of detection linear and rotational motion of a vehicle in three directions, while one or more wheel encoders 142 may be used to monitor the rotation of one or more wheels of vehicle 100.

The outputs of sensors 132-142 may be provided to a set of primary control subsystems 150, including, a localization subsystem 152, a planning subsystem 154, a perception subsystem 156, and a control subsystem 158. Localization subsystem 152 is principally responsible for precisely determining the location and orientation (also sometimes referred to as "pose", which in some instances may also include one or more velocities and/or accelerations) of vehicle 100 within its surrounding environment, and generally within some frame of reference. Planning subsystem 154 is principally responsible for planning a trajectory or path of motion for vehicle 100 over some timeframe given a desired destination as well as the static and moving objects within the environment, while perception subsystem 156 is principally responsible for detecting, tracking and/or identifying elements within the environment surrounding vehicle 100. Control subsystem 158 is principally responsible for generating suitable control signals for controlling the various controls in control system 110 in order to implement the planned trajectory or path of the vehicle. Any or all of localization subsystem 152, planning subsystem 154, perception subsystem 156, and control subsystem 158 may have associated data that is generated and/or utilized in connection with the operation thereof, and that which may be communicated to a teleassist system in some implementations.

In addition, an atlas or map subsystem 160 may be provided in the illustrated implementations to describe the elements within an environment and the relationships therebetween. Atlas subsystem 160 may be accessed by each of the localization, planning, and perception subsystems 152-156 to obtain various information about the environment for use in performing their respective functions. Atlas subsystem 160 may be used to provide map data to the autonomous vehicle control system, which may be used for various purposes in an autonomous vehicle, including for localization, planning, and perception, among other purposes. Map data may be used, for example, to lay out or place elements within a particular geographical area, including, for example, elements that represent real world objects such as roadways, boundaries (e.g., barriers, lane dividers, medians, etc.), buildings, traffic devices (e.g., traffic or road signs, lights, etc.), as well as elements that are more logical or virtual in nature, e.g., elements that represent valid pathways a vehicle may take within an environment, "virtual" boundaries such as lane markings, or elements that represent logical collections or sets of other elements. Map data may also include data that characterizes or otherwise describes elements in an environment (e.g., data describing the geometry, dimensions, shape, etc. of objects), or data that describes the type, function, operation, purpose, etc., of elements in an environment (e.g., speed limits, lane restrictions, traffic device operations or logic, etc.). In some implementations, atlas subsystem 160 may provide map data in a format in which the positions of at least some of the elements in a geographical area are defined principally based upon relative positioning between elements rather than any absolute positioning within a global coordinate system. It will be appreciated, however, that other atlas or map systems suitable for maintaining map data for use by autonomous vehicles may be used in other implementations, including systems based upon absolute positioning. Furthermore, it will be appreciated that at least some of the map data that is generated and/or utilized by atlas subsystem 160 may be communicated to a teleassist subsystem 162 in some implementations that enables human(s) to control vehicle 100 in the event of an adverse event at vehicle 100—even when those human(s) are located remotely from vehicle 100.

It will be appreciated that the collection of components illustrated in FIG. 1 for primary vehicle control system 120 is merely exemplary in nature. Individual sensors may be omitted in some implementations, multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-162 are illustrated as being separate from processors 122 and memory 124, it will be appreciated that in some implementations, some or all of the functionality of a subsystem 152-162 may be implemented with program code instructions 126 resident in one or more memories 124 and executed by one or more processors 122, and that these subsystems 152-162 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize common circuitry, processors, sensors and/or other components. Further, the various components in primary vehicle control system 120 may be networked in various manners.

In some implementations, vehicle 100 may also include a secondary vehicle control system 170, which may be used as a redundant or backup control system for vehicle 100. In some implementations, secondary vehicle control system 170 may be capable of fully operating autonomous vehicle 100 in the event of an adverse event in primary vehicle control system 120, while in other implementations, secondary vehicle control system 170 may only have limited functionality, e.g., to perform a controlled stop of vehicle 100 in response to an adverse event detected in primary vehicle control system 120. In still other implementations, secondary vehicle control system 170 may be omitted.

In general, a number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a floppy or other removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 172 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface, e.g., from a remote operator.

Moreover, vehicle 100 may include one or more network interfaces, e.g., network interface 174, suitable for communicating with one or more networks 176 (e.g., a LAN, a WAN, a wireless network, and/or the Internet, among others) to permit the communication of information with other vehicles, computers and/or electronic devices, including, for example, a central service, such as a cloud service, from which vehicle 100 receives environmental and other data for use in autonomous control thereof. In the illustrated implementations, for example, vehicle 100 may be in communication with a communications system 180 including, at least for the purposes of implementing various functions described herein, communications initiation subsystem 182, authentication subsystem 184, conversation subsystem 186, context determination subsystem 188, and action subsystem 190. In some implementations, some, or all, aspects of the communications system 190 may be implemented locally at vehicle 100 (e.g., by the one or more processors 122). In additional or alternative implementations, some, or all, aspects may be implemented remotely from vehicle 100 (e.g., by a high performance server or cluster of high performance servers).

Figure 6A:
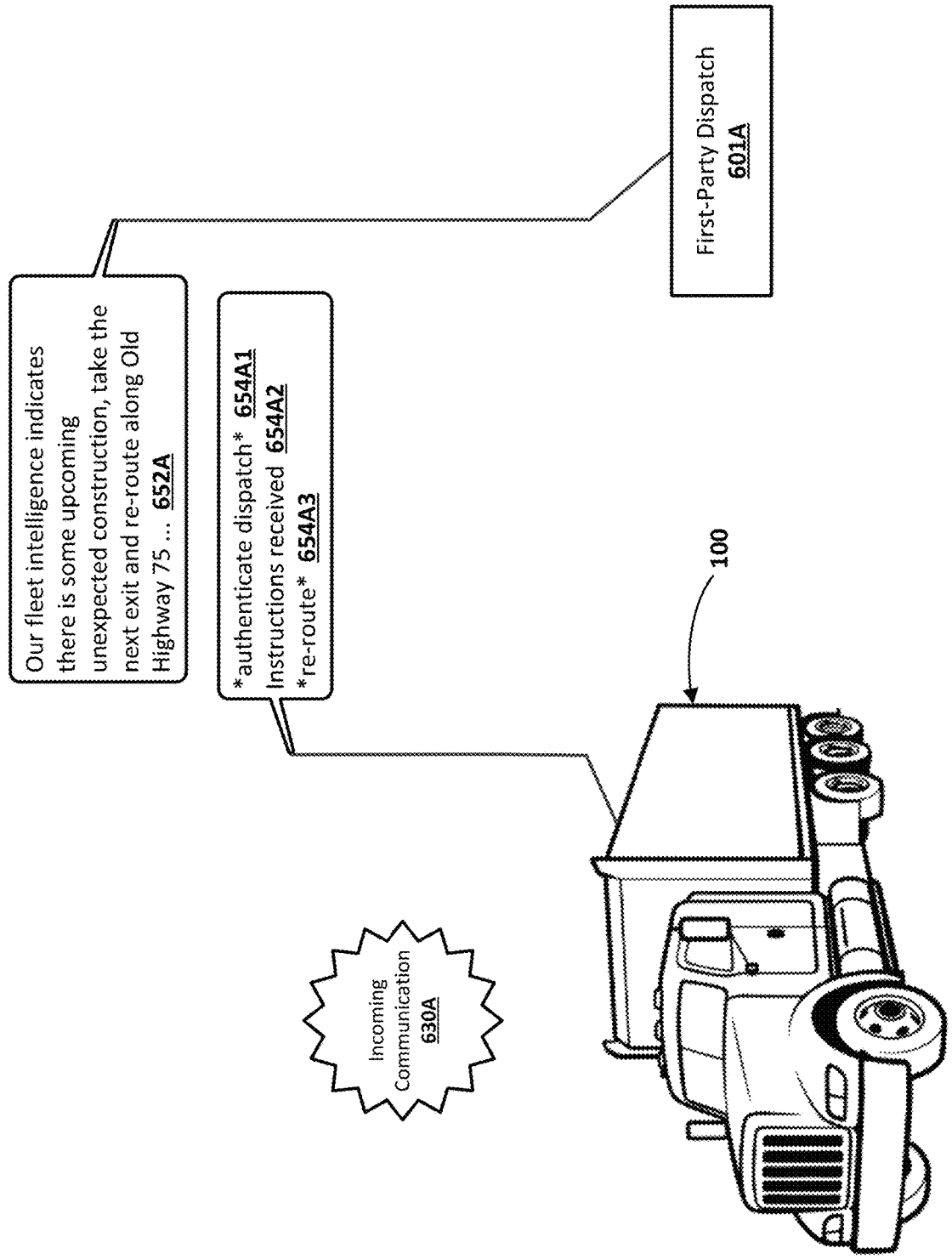
FIGS. 6A, 6B, 6C, and 6D depict non-limiting examples of reactively conducting a conversation with a remote communication participant as described with respect to FIG. 5.
Figure 6B:
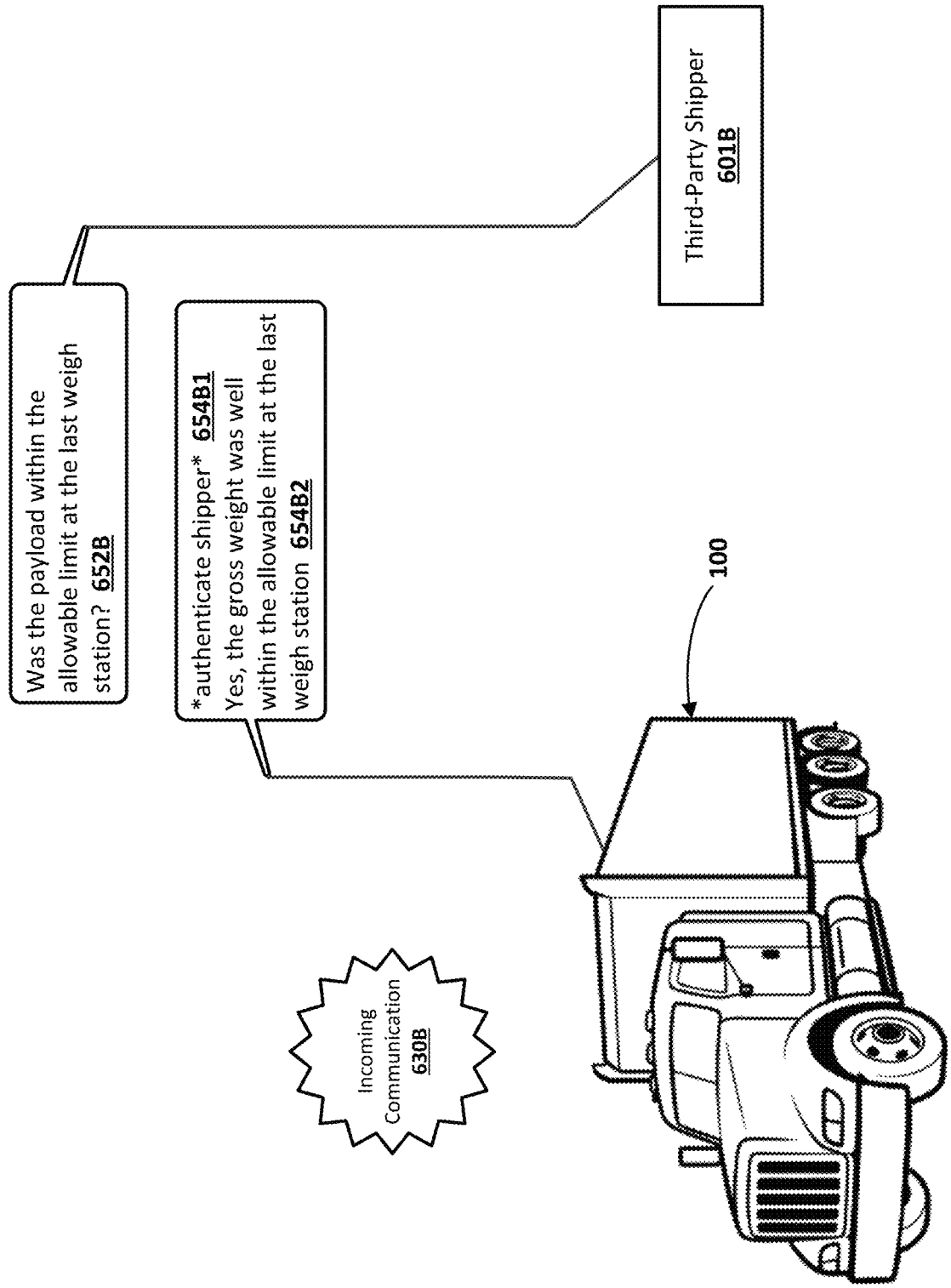
Figure 6C:
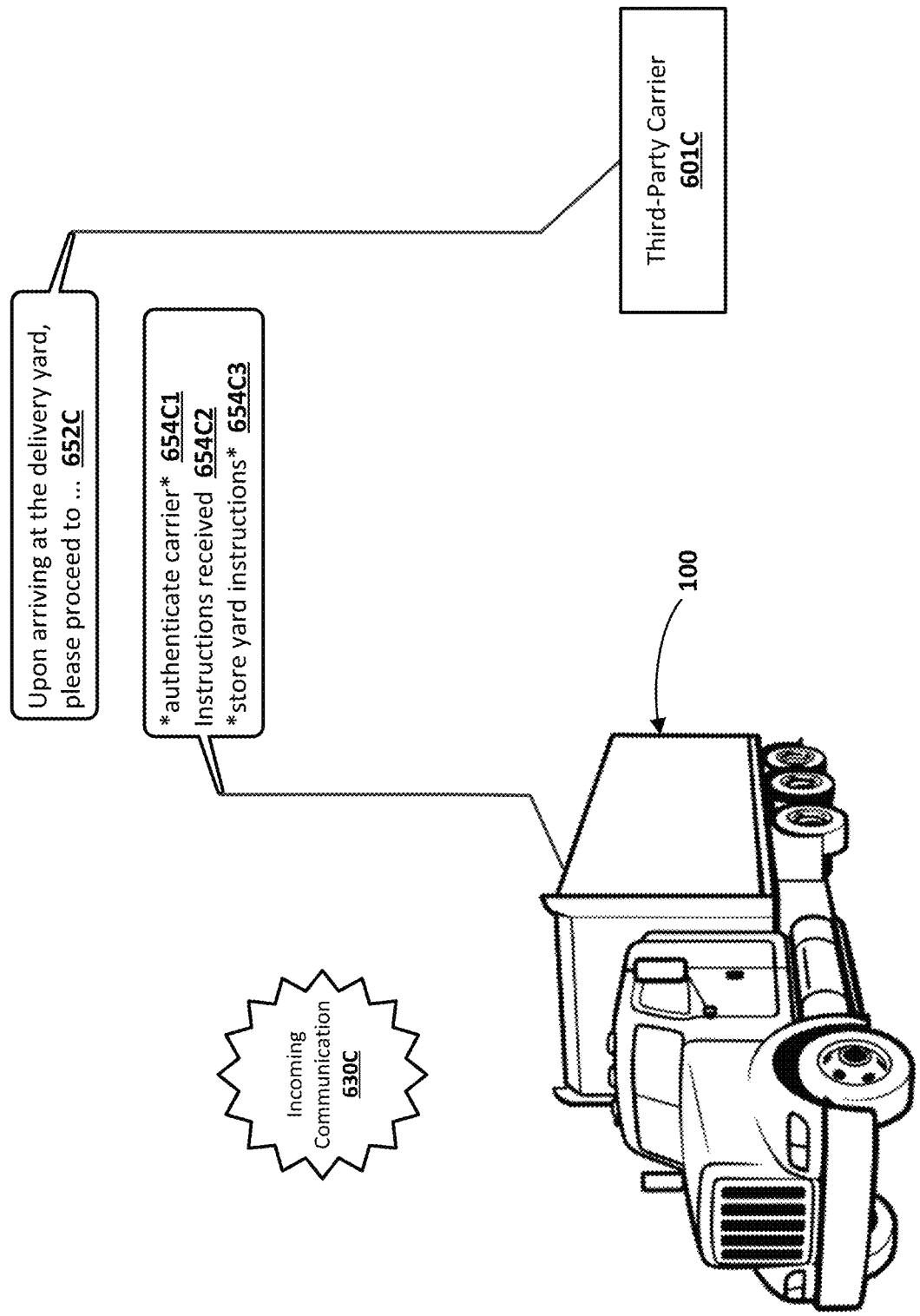
Figure 6D:
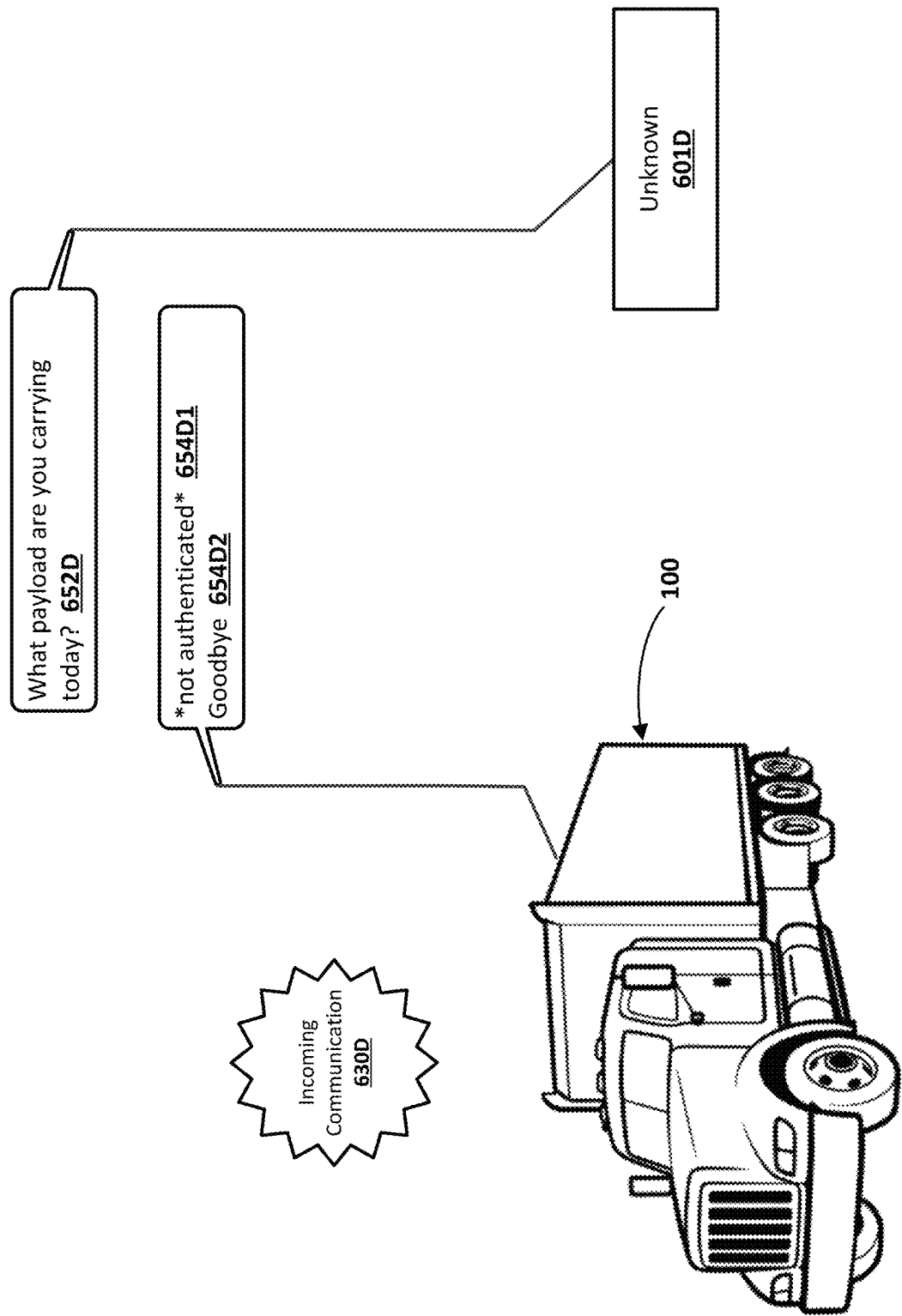
Figure 7:
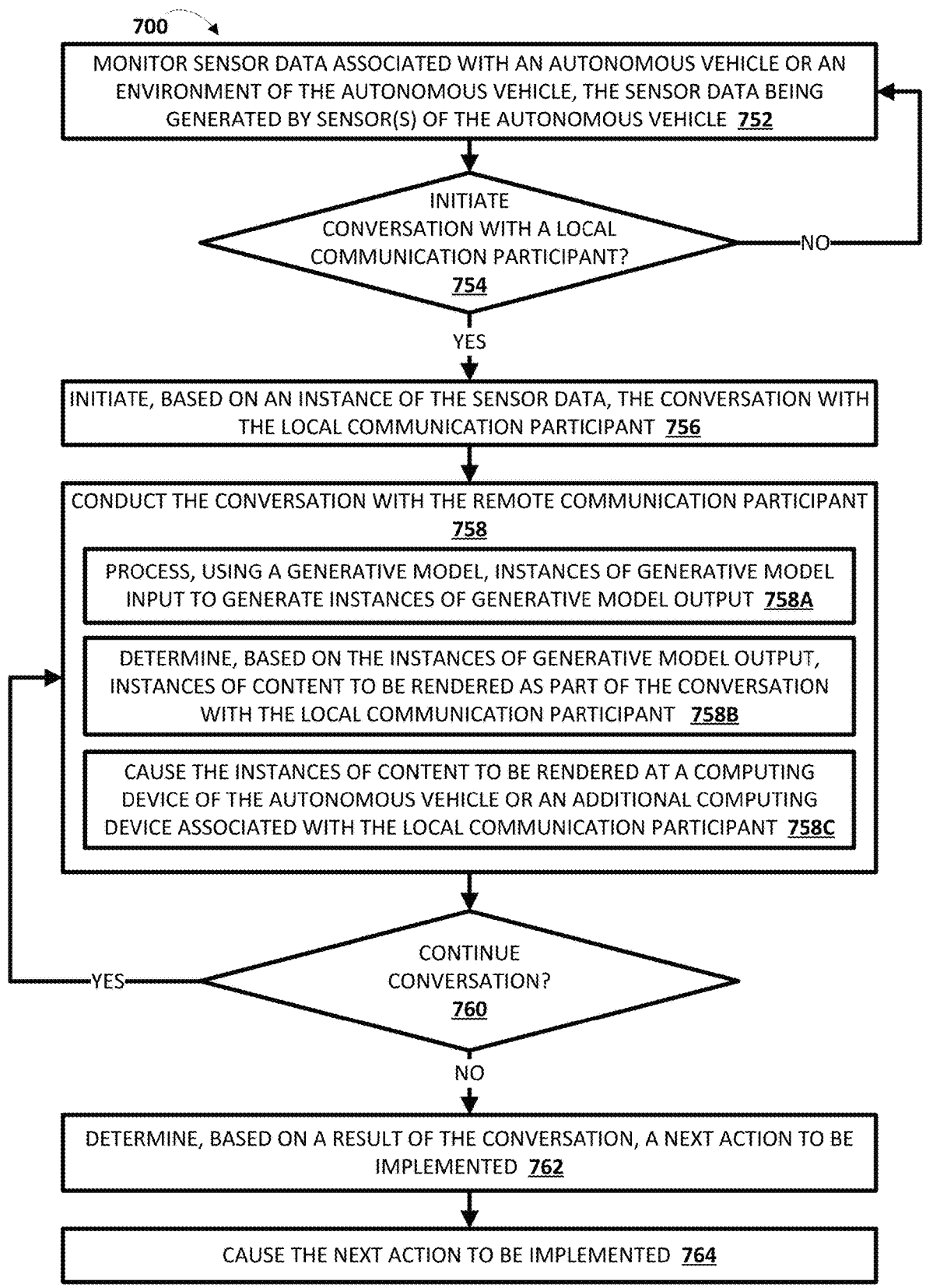
FIG. 7 is a flowchart depicting an example method of conducting a conversation with a local communication participant consistent with some implementations.
Figure 8A:
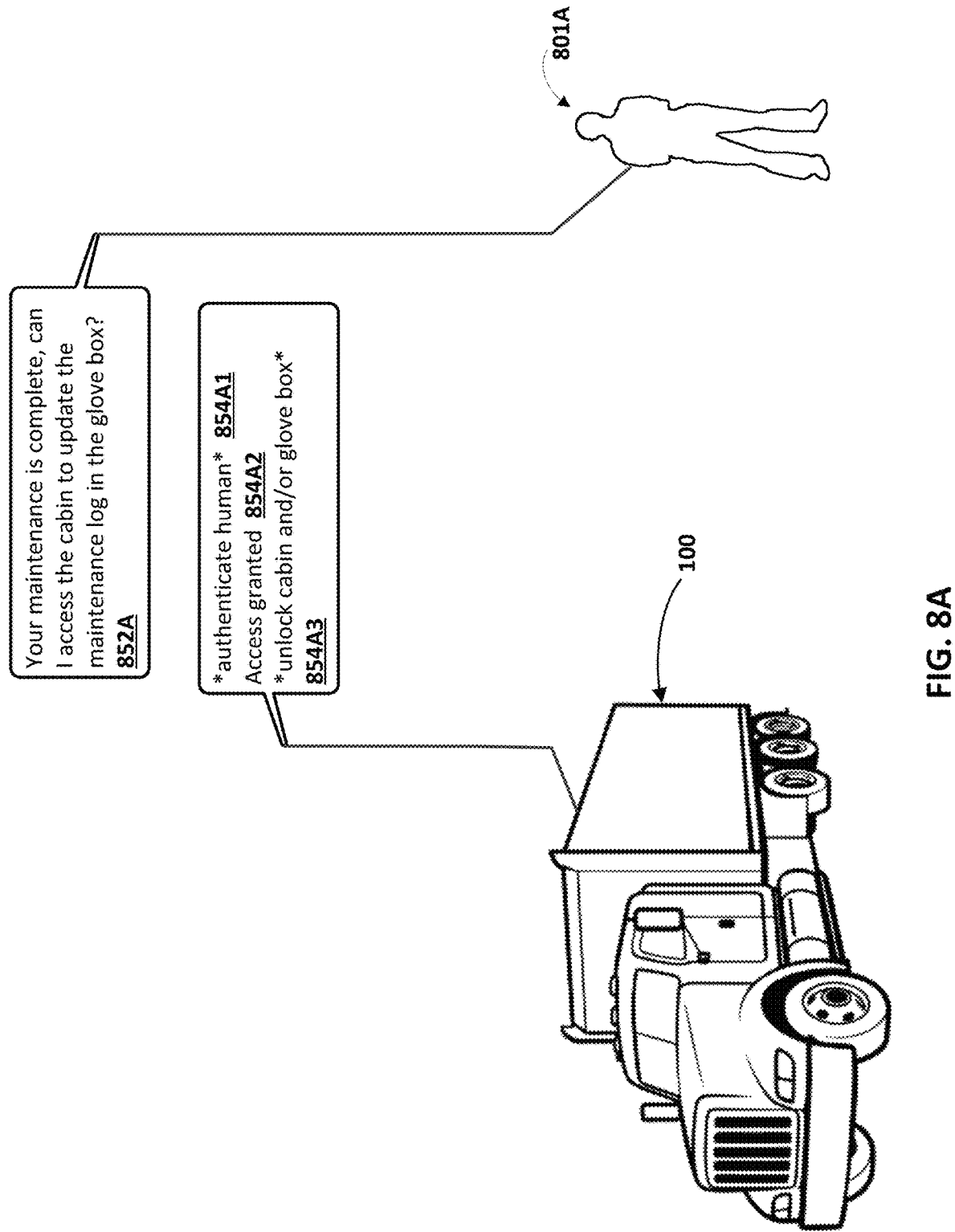
FIGS. 8A and 8B depict non-limiting examples of conducting a conversation with a local communication participant as described with respect to FIG. 7.
Figure 8B:
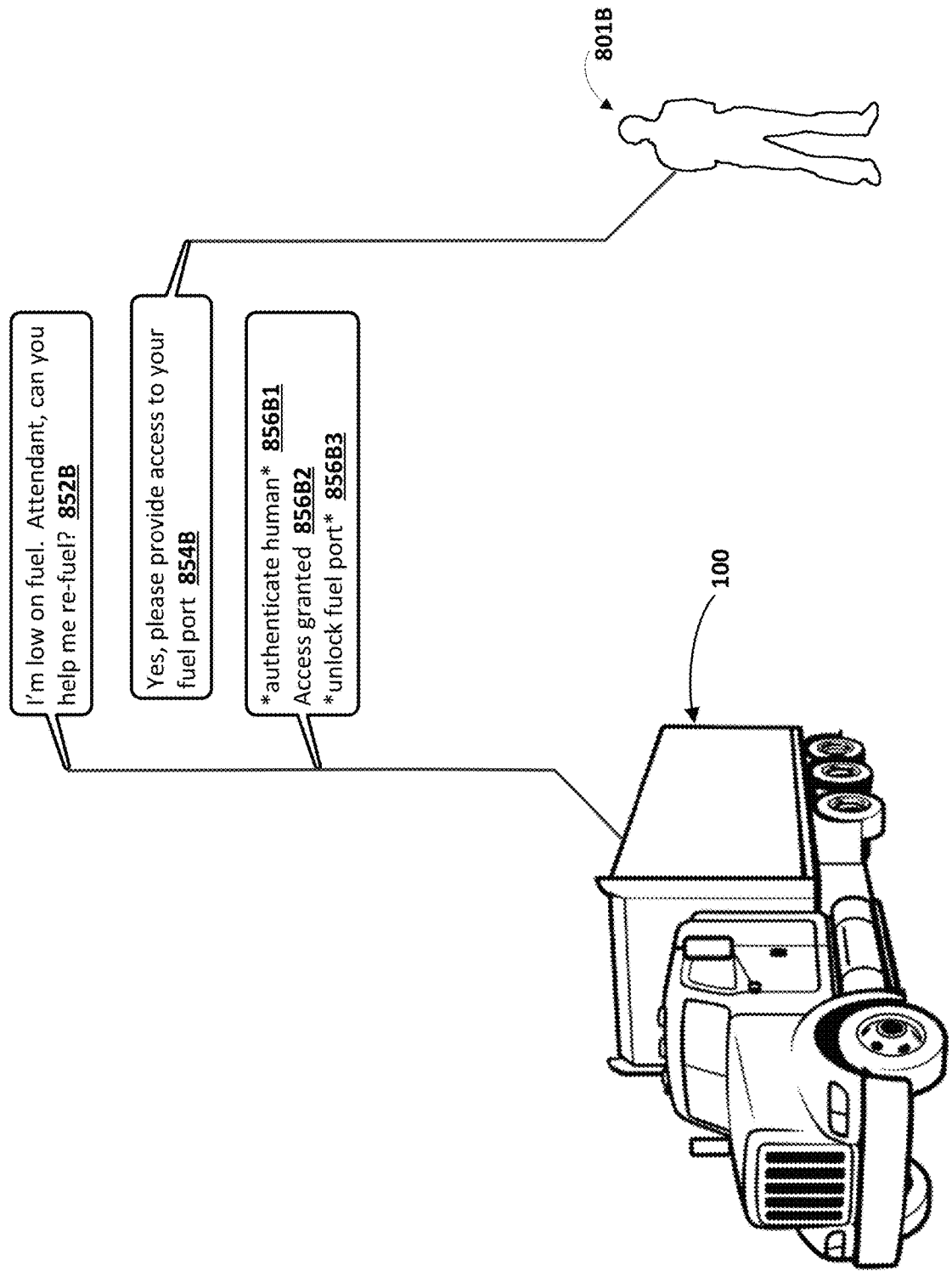

As described in more detail herein, communications initiation subsystem 182 may be configured to initiate outgoing electronic communications and conduct conversations with a remote communication participant that is located remotely from vehicle 100 (e.g., as described with respect to FIGS. 3, 4A, 4B, and 4C) and using natural language, answer incoming electronic communications initiated by a remote conversation participant that is located remotely from vehicle 100 to conduct conversations therewith (e.g., as described with respect to FIGS. 5, 6A, 6B, 6C and 6D) and using natural language, conduct conversations with a local conversation participant that is located proximate to vehicle 100 (e.g., as described with respect to FIGS. 7, 8A, and 8B). These electronic communications through which vehicle 100 can communicate with the remote conversation participant can be, for example, voice-based communications (e.g., telephone calls, etc.) and/or text-based communications (e.g., text messages, software application messages, etc.) that are in natural language. Notably, the "remote conversation participant" as described herein can be beyond a threshold distance from vehicle 100 when communicating with vehicle 100 (e.g., beyond 5 or 10 feet of vehicle 100, tens of miles away from vehicle 100, hundreds of miles away from vehicle 100, or beyond some other threshold distance of vehicle), whereas the "local conversation participant" may located within vehicle 100 or within a threshold distance of vehicle 100 (e.g., inside a cab of vehicle, within 10 feet of vehicle 100, or within some other threshold distance of vehicle 100).

Further, authentication subsystem 184 may be configured to, in various implementations, authenticate a communication participant (e.g., a remote communication participant as described herein, or a local communication participant as described herein), and determine, based on authentication of the communication participant, whether the communication participant is authorized with vehicle and/or to what extent the communication participant is authorized to communicate with vehicle 100. The authentication can include, for example, short message service token authentication, email token authentication, hardware token authentication, software token authentication, biometric authentication, password authentication, personal identification number authentication, or other forms of authentication. However, in various implementations, such as when communications initiation subsystem 182 initiates outgoing electronic communications, authentication subsystem 184 may be omitted (e.g., it may be inferred the remote communication participant is authenticated since communications initiation subsystem 182 initiates the outgoing electronic communication with the remote communication participant).

Moreover, conversation subsystem 186 may be configured to utilize various machine learning models described herein (e.g., generative model(s)), automatic speech recognition model(s), text-to-speech model(s), etc.) to engage in conversations with a communication participant (e.g., a remote communication participant as described herein, or a local communication participant as described herein). Notably, the conversations described herein can be audio-based conversations, text-based conversations, or other forms of conversations such that it appears, from the perspective of the communication participant, that they are having a conversation with vehicle 100.

Furthermore, context determination subsystem 188 may be configured to determine contextual autonomous vehicle data to be processed by conversation subsystem 186 as part of the conversation to generate content to be presented to the communication participant. The contextual autonomous vehicle data can be generated prior to the conversation being generated and stored as structured data in one or more databases (e.g., as described with respect to FIG. 2A) or generated as part of the conversation (or during the conversation). Further, the contextual autonomous vehicle data can be based on, for example, historical driving logs of vehicle 100, historical conversation logs associated with the communication participant and vehicle 100, historical sensor data generated sensor(s) of vehicle 100, historical maintenance data associated with vehicle 100, and/or other contextual autonomous vehicle data. In some implementations, the contextual autonomous vehicle data may be specific to vehicle 100 whereas in additional or alternative implementations, the contextual autonomous vehicle data may include contextual autonomous vehicle data that is more general to a fleet of vehicles (including vehicle 100).

Lastly, action subsystem 190 may be configured to determine an action to be performed based on the conversation with the communication participant. The action to be performed based on the conversation with the communication participant can include, for example, initiating additional conversation(s) with additional communication participant(s) (e.g., in parallel and/or in sequence), modifying control of vehicle 100, locking or unlocking vehicle 100 or component(s) of vehicle 100, and/or other actions. It should be understood that any action determined by action subsystem 190 can vary greatly depending on the content of the conversations described herein.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network. Further, in some implementations data recorded or collected by a vehicle may be manually retrieved and uploaded to another computer or service for analysis.

In general, routines executed to implement the various implementations described herein, whether implemented as part of an operating system or a specific application, component, program, object, module, machine learning model, or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of technical solutions described herein. Moreover, while the technical solutions described herein have and hereinafter will be described in the context of fully functioning computers and systems, it will be appreciated that the various implementations described herein are capable of being distributed as a program product in a variety of forms, and that the technical solutions described herein equally regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the technical solutions described herein should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the technical solutions described herein not limited to the specific organization and allocation of program functionality described herein.

Those skilled in the art will recognize that the exemplary environment illustrated in FIG. 1 is not intended to limit the technical solutions described herein. Indeed, those skilled in the art will recognize that other alternative hardware and/or software environments may be used without departing from the scope of the technical solutions described herein.

Figure 2A:
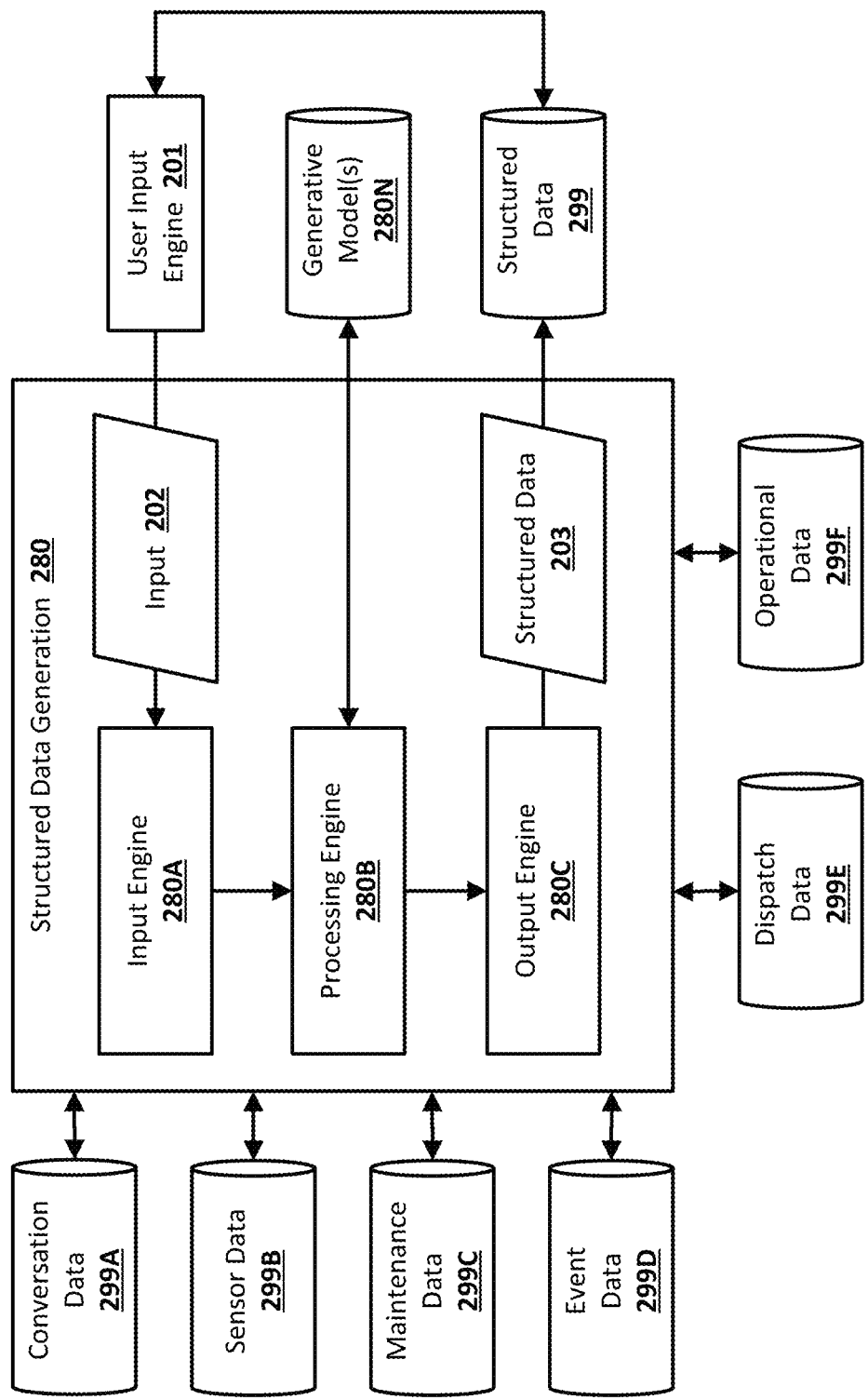
FIGS. 2A and 2B are block diagrams depicting a system for generating structured data from unstructured data to enable a communications system of an autonomous vehicle to utilize the structured data in engaging in conversations consistent with some implementations.
Figure 2B:
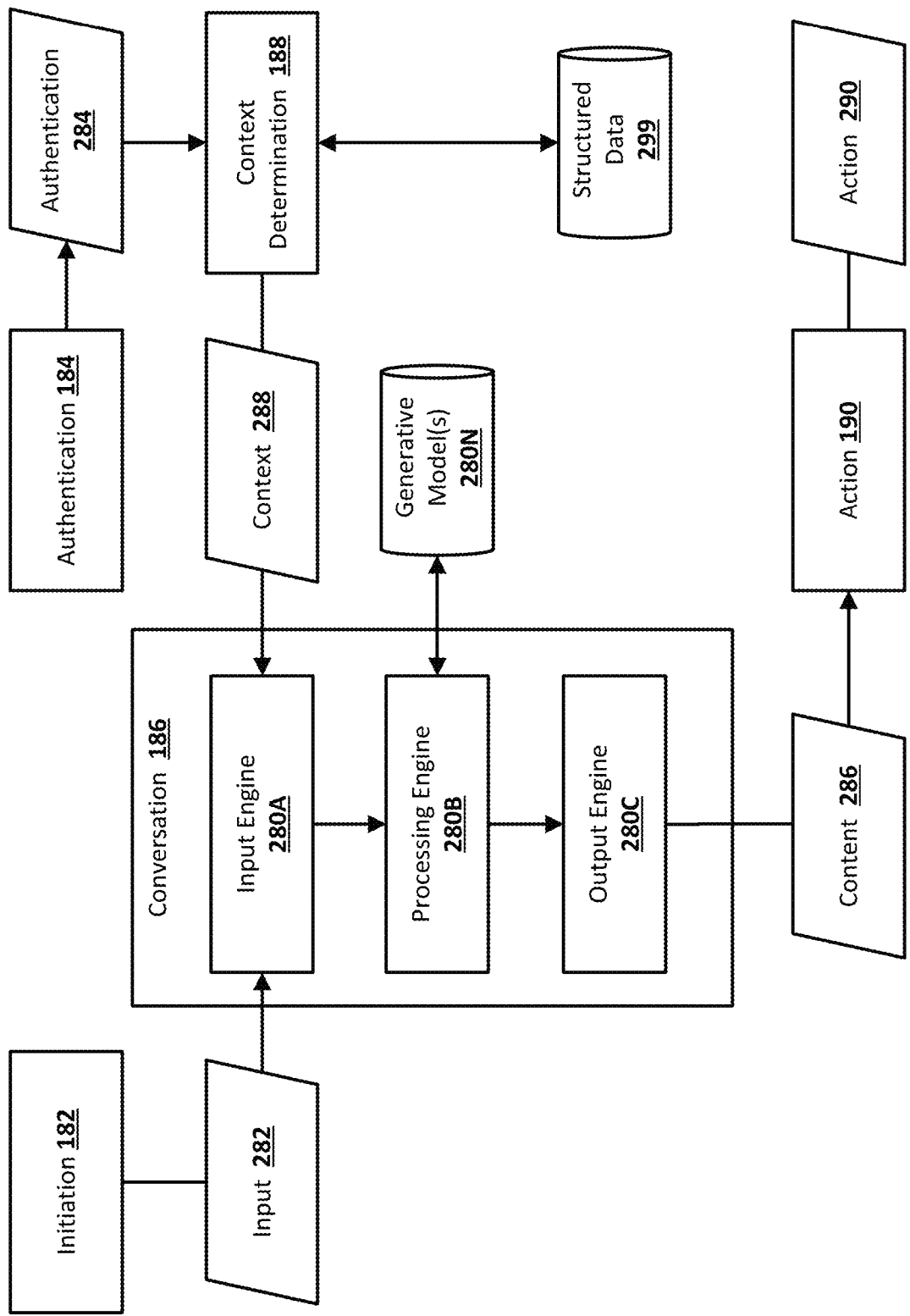

Turning now to FIGS. 2A and 2B, block diagrams illustrating a system for generating structured data from unstructured data to enable a communications system of an autonomous vehicle to utilize the structured data in engaging in conversations is depicted. Referring specifically to FIG. 2A, structured data generation system 280 is depicted and can process unstructured data from various sources, using one or more generative model(s) stored in generative model(s) database 280N, to generate structured data and store the structured data in database 299. The various sources of the unstructured data can include, for example, conversation data stored in database 299A, sensor data stored in database 299B, maintenance data stored in database 299C, event data stored in database 299D, dispatch data stored in database 299E, operational data stored in database 299F, and/or other forms of unstructured data that may be available. However, it should be understood that many other sources of unstructured data may exist. For instance, other sources of unstructured data can include freight contract data for corresponding freight contracts between a first-party entity and various disparate third-party entities, transaction data for corresponding transactions between a first-party entity and various disparate third-party entities, and/or other sources of unstructured data. This structured data can be subsequently utilized as contextual autonomous vehicle data during conversations as described herein. Moreover, it should be understood that the sources of unstructured data can be specific to a given autonomous vehicle (e.g., vehicle 100) or more general to a fleet of autonomous vehicles (e.g., vehicle 100 and other autonomous vehicles) and, as a result, the structured data that is subsequently utilized as the contextual autonomous vehicle as part of the conversations described herein can be specific to the given autonomous vehicle or more general to the fleet of autonomous vehicles.

As used herein, a "first-party entity" is an entity that develops, maintains, and/or controls primary vehicle control system 120, and may or may not manufacture vehicle 100 itself. Some non-limiting examples of first-party entities can include, for example, a manufacturer of primary vehicle control system 120, a dispatcher that dispatches vehicle 100 for an episode of locomotion, a teleassist operator that can remotely control vehicle in certain situations (e.g., failure of vehicle 100, failure of certain component(s) of vehicle 100, etc.), and/or other first-party entities. Further, a "third-party entity" is an entity that is distinct from the first-party entity that develops, maintains, and/or controls primary vehicle control system 120. Some non-limiting examples of third-party entities can include, for example, a shipper associated with a payload vehicle 100 (e.g., in situations where vehicle 100 is an autonomous tractor-trailer), a carrier associated with a trailer of vehicle 100 (e.g., in situations where vehicle 100 is an autonomous tractor-trailer), a service technician that performs maintenance of vehicle 100, an original equipment manufacturer (OEM) of vehicle 100, a fuel station attendant that services vehicle 100, a public serviceperson attempting to access vehicle 100 (e.g., public safety officer, transit authority, fire personnel, law enforcement, etc.), and/or other third-party entities.

As used herein, a "generative model" can include any sequence-to-sequence based machine learning model capable of generating generative vision data, generative audio data, generative textual data, and/or other forms of generative data. Some non-limiting examples of sequence-to-sequence based machine learning models that are capable of generating one or more forms of the generative data noted above include transformer machine learning models (e.g., encoder-decoder transformer models, encoder-only transformer models, decoder-only transformer models, etc. that optionally employ an attention mechanism or some other form of memory), stable diffusion machine learning models, recurrent neural network (RNN) machine learning models, generative adversarial network (GAN) machine learning models, etc. Various sequence-to-sequence based machine learning models have demonstrated multimodal capabilities in that they are capable of processing inputs in various modalities (e.g., text-based inputs, vision-based inputs, audio-based inputs, etc.) and generating outputs in various modalities (e.g., text-based output, vision-based outputs, audio-based generative outputs, etc.). In some implementations, the generative model(s) described herein can be implemented locally at vehicle 100. In additional or alternative implementations, the generative model(s) described herein can be implemented remotely from vehicle (e.g., by high performance server(s) communicatively coupled to vehicle 100 via network(s) 176).

Further, various sequence-to-sequence based machine learning models have demonstrated multilingual capabilities in that they are capable of processing inputs in various languages and generating outputs in various languages. For example, a sequence-to-sequence based machine learning model can be capable of processing inputs in a first language (e.g., English) and generating outputs in the first language (e.g., English). Further, the same sequence-to-sequence based machine learning model can be capable of processing inputs in a second language (e.g., Spanish) and generating outputs in the second language (e.g., Spanish). Although the above example is described with respect to generating outputs in the same language as the language that is processed, it should be understood that is for the sake of example and is not meant to be limiting. For instance, the same sequence-to-sequence based machine learning model can be capable of processing inputs in a first language (e.g., English) and generating outputs in a second language (e.g., Spanish). Accordingly, it should be understood that the natural language communications described herein can be performed in multiple disparate languages and, as a result, the generative model utilized in these natural language communications can dynamically adapt across the natural language communications described herein across multiple disparate languages.

In addition, in some implementations, the generative model(s) described herein may be considered to be "foundation model(s)," which may be considered to be AI model(s) trained on broad data, generally using self-supervision, containing at least a billion parameters, and applicable across a wide range of contexts. Further, in some implementations, generative model(s) may be considered to be "generalized foundation model(s)" insofar as its applicability is of a generalized nature having applicability to a wide variety of domains, as opposed to an "application-specific model" that is specifically adapted for particular applications or domains (e.g., through specialized training performing using supervised fine-tuning, reinforcement learning through human feedback, and/or other techniques).

In some implementations, the generative model(s) described herein may be trained (sometimes referred to as "pre-trained") by a first-party entity for various tasks. The generative model(s) are typically trained on enormous amounts of diverse data including data from, but not limited to, webpages, electronic books, software code, electronic news articles, machine translation data, and/or other sources of data. By training the generative model(s) on this enormous amounts of diverse data, parametric knowledge is gained such that the generative model(s) can include hundreds of millions of parameters, billions of parameters, or even one hundred billion or more parameters (which can optionally be distilled into smaller generative model(s)). Accordingly, the generative model(s) can leverage the underlying data on which they were trained in performing these various tasks, such as conducting the conversations as described herein. In some versions of those implementations, the first-party entity can further perform supervised fine-tuning and/or reinforcement learning from human feedback to further train and/or fine-tune the generative model(s) for specific tasks. For example, the first-party entity can utilize supervised fine-tuning to specifically fine-tune the generative model(s) to engage in conversations, process contextual autonomous vehicle data during these conversations, determine action(s) to be performed based on these conversations, etc. Additionally, or alternatively, a developer associated with the first-party entity can be "in-the-loop" during these conversations to provide a feedback signal on content generated using the generative model(s) (e.g., conversational replies), which can be utilized to update the generative model(s). Further, the first-party entity may utilize various prompt engineering techniques at inference and in addition to using supervised fine-tuning and/or reinforcement learning from human feedback to further train and/or fine-tune the generative model(s). In additional or alternative versions of those implementations, the first-party entity may forego performing any supervised fine-tuning and/or reinforcement learning from human feedback and utilize various prompt engineering techniques at inference.

In additional or alternative implementations, the generative model(s) described herein may be trained (or "pre-trained") by a third-party entity (e.g., in the same or similar manner described above, but based on at least some different data), but provided to a first-party entity. In some versions of those implementations, the first-party entity can further perform supervised fine-tuning and/or reinforcement learning from human feedback to further train and/or fine-tune the generative model(s) for specific tasks (e.g., in the same or similar manner described above). Further, the first-party entity may utilize various prompt engineering techniques at inference and in addition to using supervised fine-tuning and/or reinforcement learning from human feedback to further train and/or fine-tune the generative model(s). In additional or alternative versions of those implementations, the first-party entity may forego performing any supervised fine-tuning and/or reinforcement learning from human feedback and utilize various prompt engineering techniques at inference.

In additional or alternative implementations, the generative model(s) described herein may be trained (or "pre-trained") by a third-party entity (e.g., in the same or similar manner described above, but based on at least some different data), and maintained by the third-party entity. In some versions of those implementations, the third-party entity can further perform supervised fine-tuning and/or reinforcement learning from human feedback to further train and/or fine-tune the generative model(s) for specific tasks (e.g., in the same or similar manner described above), but using data that is specific to a first-party entity and on behalf of the first-party entity. Further, the first-party entity may utilize various prompt engineering techniques at inference and in addition to using supervised fine-tuning and/or reinforcement learning from human feedback to further train and/or fine-tune the generative model(s). In additional or alternative versions of those implementations, the third-party entity may forego performing any supervised fine-tuning and/or reinforcement learning from human feedback and utilize various prompt engineering techniques at inference. Notably, in these implementations, the first-party entity can make application programming interface calls to the generative model(s) maintained by the third-party, but provide generative model input(s) described herein in a secure and/or encrypted manner to ensure data security.

Conversation data stored in database 299A can include raw conversation data corresponding to various conversations of multiple parties that have an interest in vehicle 100 and/or other vehicles. These parties can include, but are not limited to, the first-party entities and/or the third-party entities. The raw conversation data can be in unstructured form in that they can include audio data capturing these various conversations and/or transcripts of these various conversations. For example, the raw conversation data can include conversations between a dispatcher of vehicle 100 and a teleassist operator of vehicle 100; between a dispatcher of vehicle 100 and a shipper that owns or controls a payload of vehicle 100; between a dispatcher of vehicle 100 and a carrier that owns or controls a trailer of vehicle 100; between a shipper that owns or controls a payload of vehicle 100 and a carrier that owns or controls a trailer of vehicle 100; between a human driver of an additional vehicle (e.g., a non-autonomous vehicle or an ego vehicle) and one of: a dispatcher of the additional vehicle, a carrier that owns or controls a trailer of the additional vehicle (e.g., in situations where the additional vehicle is a tractor-trailer), or a shipper that owns or controls a payload of the additional vehicle (e.g., in situations where the additional vehicle is the tractor-trailer); and so on. However, the raw conversation data may not include an indication of an entity that is participating in the conversation, may not be indexed, may not be structured, etc.

Accordingly, in various implementations, and in generating structured conversation data, user input engine 201 can detect input 202 provided by a developer associated with the first-party entity that is directed to structured data generation system 280. Input 202 can include, for example, a prompt or instructions for the generative model(s) to generate the structured conversation data from the unstructured conversation data stored in the database 299A. In some versions of those implementations, user input 202 can include an indication of unstructured data for conversations between particular entities to generate the structured data for the conversations. Some non-limiting examples of a prompt or instructions for the generative model(s) to generate the structured conversation data can include: "generate structured data for conversations between a dispatcher of vehicle 100 and a carrier that owns or controls a trailer of vehicle 100", "generate structured data for conversations between a human driver of an additional vehicle (e.g., a non-autonomous vehicle or an ego vehicle) and one of: a dispatcher of the additional vehicle, a carrier that owns or controls a trailer of the additional vehicle (e.g., in situations where the additional vehicle is a tractor-trailer), or a shipper that owns or controls a payload of the additional vehicle (e.g., in situations where the additional vehicle is the tractor-trailer)", and so on. In additional or alternative versions of those implementations, user input 202 can include the unstructured conversation data. In other additional or alternative versions of those implementations, structured data generation system 280 can obtain the unstructured conversation data from database 299A using, for example, a retrieval augmented generation process and based on input 202.

Further, input engine 280A can generate generative model input that includes at least input 202 and unstructured conversation data obtained from database 299A, processing engine 280B can process, using the generative model(s), the generative model input to generate generative model output, and output engine 280C can determine structured data 203 corresponding the structured conversation data based on the generative model output. The structured conversation data can be stored in database 299 for subsequent utilization as the contextual autonomous vehicle data described herein. Notably, the generative model input can be a formatted version of input 202 and the unstructured conversation data obtained from database 299A that is suitable for processing by the generative model (e.g., a tokenized version of input 202 and the unstructured conversation data). Further, the generative model output can include the structured conversation data or a probability distribution over a sequence of tokens based on which the structured conversation data can be determined.

Sensor data stored in database 299B can include raw sensor data generated by vehicle 100, such as historical sensor data from prior episodes of locomotion of vehicle 100 and/or current sensor data from a current episode of locomotion of vehicle 100. The raw sensor data can be in unstructured form in that it includes raw sensor values generated by various sensors of primary sensors 130, and may be specific to vehicle 100 for different episodes of locomotion of vehicle 100. For example, the raw sensor data can include SATNAV values generated by SATNAV 132, RADAR values generated by RADAR 134, LIDAR values or LIDAR point clouds generated by LIDAR 136, image(s) and/or video(s) (or pixel values thereof) generated by camera(s) 138, IMU values generated by IMU(s) 140, encoder values generated by encoder(s) 142, and/or other sensor values of other sensor(s) of vehicle 100. However, the raw sensor data may not be readily interpretable by a human reviewer. Notably, the episodes of locomotion (prior episodes and/or current episodes) described herein can include any motion of vehicle 100 (or other vehicles described herein). For instance, a given episode of locomotion can include, vehicle 100 moving forward, vehicle 100 moving in reverse, vehicle 100 parking, vehicle 100 merging, vehicle 100 merging, and/or vehicle 100 performing any other motion for a given duration of time.

Accordingly, in various implementations, and in generating structured sensor data, user input engine 201 can detect input 202 provided by a developer associated with the first-party entity that is directed to structured data generation system 280. Input 202 can include, for example, a prompt or instructions for the generative model(s) to generate the structured sensor data from the unstructured sensor data stored in the database 299B. In some versions of those implementations, user input 202 can include an indication of unstructured data for sensor data from particular episodes of locomotion, an indication of unstructured data for sensor data generated by particular sensor(s), and so on. Some non-limiting examples of a prompt or instructions for the generative model(s) to generate the structured sensor data can include: "generate structured data for all sensor data from the episode of locomotion on Oct. 11, 2024", "generate structured data for all LIDAR data for vehicle 100 and index it by episode of locomotion", and so on. In additional or alternative versions of those implementations, user input 202 can include the unstructured sensor data. In other additional or alternative versions of those implementations, structured data generation system 280 can obtain the unstructured sensor data from database 299B using, for example, a retrieval augmented generation process and based on input 202.

Further, input engine 280A can generate generative model input that includes at least input 202 and unstructured sensor data obtained from database 299B, processing engine 280B can process, using the generative model(s), the generative model input to generate generative model output, and output engine 280C can determine structured data 203 corresponding the structured sensor data based on the generative model output. The structured sensor data can be stored in database 299 for subsequent utilization as the contextual autonomous vehicle data described herein. Notably, the generative model input can be a formatted version of input 202 and the unstructured sensor data obtained from database 299A that is suitable for processing by the generative model (e.g., a tokenized version of input 202 and the unstructured sensor data). Further, the generative model output can include the structured sensor data or a probability distribution over a sequence of tokens based on which the structured sensor data can be determined.

Maintenance data stored in database 299C can include raw maintenance data for vehicle 100, such as oil or battery changes of vehicle 100, service appointments of vehicle 100, and so on. The raw maintenance data can be in unstructured form in that it may be unformatted text provided by a service provider that performed the maintenance, may not be indexed, and so on. For example, the raw maintenance data can include log entries provided by the service provider. However, those log entries may not have any uniform format, uniform information that is included, etc.

Accordingly, in various implementations, and in generating structured maintenance data, user input engine 201 can detect input 202 provided by a developer associated with the first-party entity that is directed to structured data generation system 280. Input 202 can include, for example, a prompt or instructions for the generative model(s) to generate the structured maintenance data from the unstructured maintenance data stored in the database 299C. In some versions of those implementations, user input 202 can include an indication of unstructured data for maintenance data from particular maintenance appointments or within a particular range of times/dates, an indication of unstructured data for maintenance data provided by a particular maintenance provider, and so on. Some non-limiting examples of a prompt or instructions for the generative model(s) to generate the structured maintenance data can include: "generate structured data for all maintenance data for vehicle 100 that has been performed in the last two years", "generate structured data for all maintenance data for vehicle 100 that has been performed by service provider X", and so on. In additional or alternative versions of those implementations, user input 202 can include the unstructured maintenance data. In other additional or alternative versions of those implementations, structured data generation system 280 can obtain the unstructured maintenance data from database 299C using, for example, a retrieval augmented generation process and based on input 202.

Further, input engine 280A can generate generative model input that includes at least input 202 and unstructured maintenance data obtained from database 299C, processing engine 280B can process, using the generative model(s), the generative model input to generate generative model output, and output engine 280C can determine structured data 203 corresponding the structured maintenance data based on the generative model output. The structured maintenance data can be stored in database 299 for subsequent utilization as the contextual autonomous vehicle data described herein. Notably, the generative model input can be a formatted version of input 202 and the unstructured maintenance data obtained from database 299A that is suitable for processing by the generative model (e.g., a tokenized version of input 202 and the unstructured maintenance data). Further, the generative model output can include the structured maintenance data or a probability distribution over a sequence of tokens based on which the structured maintenance data can be determined.

Event data stored in database 299D can include raw event data for vehicle 100, such as weigh station visits of vehicle 100 (e.g., in situations in which vehicle 100 is an autonomous tractor-trailer), fueling visits for vehicle 100, anomalies detected by perception subsystem 156, and so on. The raw event data can be in unstructured form in that it may be unformatted text provided by a weigh station operator, may indicate when certain fueling visits were performed for vehicle 100 without analysis of any trends, may not be indexed, and so on. For example, the raw event data can include log entries provided by the weigh station operator. However, those log entries may not have any uniform format, uniform information that is included, etc.

Accordingly, in various implementations, and in generating structured event data, user input engine 201 can detect input 202 provided by a developer associated with the first-party entity that is directed to structured data generation system 280. Input 202 can include, for example, a prompt or instructions for the generative model(s) to generate the structured event data from the unstructured event data stored in the database 299D. In some versions of those implementations, user input 202 can include an indication of unstructured data for event data from particular events or within a particular range of times/dates (and specified with varying degrees of granularity), an indication of unstructured data across certain durations of time to analyze trends, and so on. Some non-limiting examples of a prompt or instructions for the generative model(s) to generate the structured event data can include: "generate structured data for all weigh station stops for vehicle 100", "generate structured data for all events in which perception subsystem 156 saw something weird", and so on. In additional or alternative versions of those implementations, user input 202 can include the unstructured event data. In other additional or alternative versions of those implementations, structured data generation system 280 can obtain the unstructured event data from database 299D using, for example, a retrieval augmented generation process and based on input 202.

Further, input engine 280A can generate generative model input that includes at least input 202 and unstructured event data obtained from database 299D, processing engine 280B can process, using the generative model(s), the generative model input to generate generative model output, and output engine 280C can determine structured data 203 corresponding the structured event data based on the generative model output. The structured event data can be stored in database 299 for subsequent utilization as the contextual autonomous vehicle data described herein. Notably, the generative model input can be a formatted version of input 202 and the unstructured event data obtained from database 299A that is suitable for processing by the generative model (e.g., a tokenized version of input 202 and the unstructured event data). Further, the generative model output can include the structured event data or a probability distribution over a sequence of tokens based on which the structured event data can be determined.

Dispatch data stored in database 299E can include raw dispatch data for vehicle 100, such as prior and/or current episodes of locomotion performed by vehicle 100, prior and/or current payloads of vehicle 100 (e.g., in situations in which vehicle 100 is an autonomous tractor-trailer), prior and/or current shippers associated with a payload of vehicle 100 (e.g., in situations in which vehicle 100 is an autonomous tractor-trailer), prior and/or current carriers associated with a trailer of vehicle 100 (e.g., in situations in which vehicle 100 is an autonomous tractor-trailer), and so on. The raw dispatch data can be in unstructured form in that it may be unformatted text, may only be available across different platforms (e.g., websites, software applications, etc.), may not be indexed, and so on. For example, the raw dispatch data can include log entries indicating origination locations of vehicle 100, destination locations of vehicle 100, routes taken by vehicle 100. However, those log entries may be provided by different dispatchers of vehicle 100 that utilize different annotations and/or nomenclature to describe these routes and/or locations.

Accordingly, in various implementations, and in generating structured dispatch data, user input engine 201 can detect input 202 provided by a developer associated with the first-party entity that is directed to structured data generation system 280. Input 202 can include, for example, a prompt or instructions for the generative model(s) to generate the structured dispatch data from the unstructured dispatch data stored in the database 299E. In some versions of those implementations, user input 202 can include an indication of unstructured data for dispatch data from particular episodes of locomotion, dispatch data from episodes of locomotion associated with a particular shipper and/or a particular carrier, and so on. Some non-limiting examples of a prompt or instructions for the generative model(s) to generate the structured event data can include: "generate structured data for all episodes of locomotion of vehicle 100 associated with shipper X and carrier Y", "generate structured data for all episodes of locomotion of vehicle 100 associated with shipper X", "generate structured data for episodes of locomotion of vehicle 100 associated with carrier Y from this year", and so on. In additional or alternative versions of those implementations, user input 202 can include the unstructured dispatch data. In other additional or alternative versions of those implementations, structured data generation system 280 can obtain the unstructured dispatch data from database 299E using, for example, a retrieval augmented generation process and based on input 202.

Further, input engine 280A can generate generative model input that includes at least input 202 and unstructured dispatch data obtained from database 299E, processing engine 280B can process, using the generative model(s), the generative model input to generate generative model output, and output engine 280C can determine structured data 203 corresponding the structured dispatch data based on the generative model output. The structured dispatch data can be stored in database 299 for subsequent utilization as the contextual autonomous vehicle data described herein. Notably, the generative model input can be a formatted version of input 202 and the unstructured dispatch data obtained from database 299A that is suitable for processing by the generative model (e.g., a tokenized version of input 202 and the unstructured dispatch data). Further, the generative model output can include the structured dispatch data or a probability distribution over a sequence of tokens based on which the structured dispatch data can be determined.

Operational data stored in database 299F can include raw operational data for shippers and/or carriers associated with vehicle 100 (e.g., assuming vehicle 100 is an autonomous tractor-trailer), such as information about a payload of vehicle 100 that is owned and/or controlled by a shipper (e.g., contents of the payload, history of the payload, weight of the payload, etc.), information about a trailer of vehicle 100 that is owned and/or controlled by a carrier (e.g., average fuel economy of vehicle 100, current fuel economy of vehicle 100, registration status of vehicle 100, etc.), and so on. The raw operational data can be in unstructured form in that it may be unformatted text, may only be available across different platforms (e.g., websites, software applications, etc.), may not be indexed, and so on. For example, the raw operational data can include log entries indicating the aforementioned information associated with the shippers and/or carriers. However, those log entries may be provided by different dispatchers of vehicle 100 that utilize different annotations and/or nomenclature to describe these routes and/or locations.

Accordingly, in various implementations, and in generating structured operational data, user input engine 201 can detect input 202 provided by a developer associated with the first-party entity that is directed to structured data generation system 280. Input 202 can include, for example, a prompt or instructions for the generative model(s) to generate the structured operational data from the unstructured operational data stored in the database 299F. In some versions of those implementations, user input 202 can include an indication of unstructured data for operational data for particular shippers and/or carriers, operational data for particular combinations of shippers and/or carriers, and so on. Some non-limiting examples of a prompt or instructions for the generative model(s) to generate the structured event data can include: "generate structured data for the operational data associated with shipper X and carrier Y", "generate structured data for the operational data associated with shipper X only", "generate structured data for the operational data associated with carrier Y only", and so on. In additional or alternative versions of those implementations, user input 202 can include the unstructured operational data. In other additional or alternative versions of those implementations, structured data generation system 280 can obtain the unstructured operational data from database 299F using, for example, a retrieval augmented generation process and based on input 202.

Further, input engine 280A can generate generative model input that includes at least input 202 and unstructured operational data obtained from database 299F, processing engine 280B can process, using the generative model(s), the generative model input to generate generative model output, and output engine 280C can determine structured data 203 corresponding the structured operational data based on the generative model output. The structured operational data can be stored in database 299 for subsequent utilization as the contextual autonomous vehicle data described herein. Notably, the generative model input can be a formatted version of input 202 and the unstructured operational data obtained from database 299A that is suitable for processing by the generative model (e.g., a tokenized version of input 202 and the unstructured operational data). Further, the generative model output can include the structured operational data or a probability distribution over a sequence of tokens based on which the structured operational data can be determined.

In various implementations, while generating and storing the structured data in the database 299 and/or subsequent to generating and storing the structured data in the database 299, a developer associated with structured data generation system 280 can restrict access to certain portions of the structured data for utilization as the contextual autonomous vehicle data during subsequent conversations. For example, the first-party entity may have access to all of the structured data, some third-party entities may only have access to certain subsets of the structured data, and some other third-party entities may not have access to any of the structured data. For instance, for conversations involving a dispatcher and/or teleassist operator associated with vehicle 100, there may not be any restrictions on the structured data stored in the database 299 that can be utilized as the contextual autonomous vehicle data in conducting these conversations. However, for conversations involving a shipper of a payload of a trailer of vehicle 100, the structured data stored in the database 299 that can be utilized as the contextual autonomous vehicle data in conducting these conversations may be limited to a first subset of the structured data (e.g., structured dispatch data from episodes of locomotion that involve the shipper, structured operational data associated with the shipper but not any operational data that is associated with the carrier, etc.) that can be utilized as the contextual autonomous vehicle data in conducting these conversations. Further, for conversations involving a carrier associated with the trailer of vehicle 100, the structured data stored in the database 299 that can be utilized as the contextual autonomous vehicle data in conducting these conversations may be limited to a second subset of the structured data that differs from the first subset of the structured data (e.g., structured dispatch data from episodes of locomotion that involve the carrier, structured operational data associated with the carrier but not any operational data that is associated with the shipper, etc.) that can be utilized as the contextual autonomous vehicle data in conducting these conversations.

Referring briefly to FIG. 2B, initiation subsystem 182, authentication subsystem 184, conversation subsystem 186, context determination subsystem 188, and action subsystem 190 are depicted. Notably, vehicle 100 can utilize subsystems of 182-190 of communications system 180 to conduct the conversations described herein.

In some implementations (e.g., as described with respect to FIGS. 3, 4A, 4B, and 4C), conversation subsystem 186 can initiate and engage in a conversation with a remote communication participant based on input 282 received from initiation subsystem 182 indicating that the conversation should be initiated and conducted. Input 282 can be determined based on, for example, an instance of sensor data generated by primary sensor system 130 of vehicle 100. Further, based on the instance of sensor data that was utilized to determine input 282, initiation subsystem 182 and/or conversation subsystem 186 can identify the remote communication participant. Moreover, and based on the remote communication participant, context determination subsystem 188 can determine contextual autonomous vehicle data (e.g., stored in database 299 as described with respect to FIG. 2A) to determine context 288 for the conversation. In some versions of these implementations, since initiation subsystem 182 and/or conversation subsystem 186 is initiating the conversation with the remote communication participant, operations of authentication subsystem 184 may be omitted. However, in other versions of these implementations, operations of authentication subsystem 184 may still be performed to authenticate the remote communication participant as an extra layer of data security. As part of the conversation, conversation subsystem 186 can determine content 286 to be rendered for presentation to the remote communication participant throughout the conversation. Lastly, action subsystem 190 can determine an action 290 to be performed based on a result of the conversation.

In some implementations (e.g., as described with respect to FIGS. 5, 6A, 6B, 6C and 6D), conversation subsystem 186 can engage in a conversation with a remote communication participant based on input 282 received from initiation subsystem 182 indicating that an incoming electronic communication is directed to vehicle 100. Input 282 can be determined based on, for example, a type of the incoming electronic communication, a phone number or device identifier associated with a computing device from which the incoming electronic communication originates, and/or other content. Further, based on the instance of sensor data that was utilized to determine input 282, authentication subsystem 184 and/or conversation subsystem 186 can initially engage in the conversation with the remote communication participant to authenticate the remote communication participant. Moreover, and based on authentication 284 of the remote communication participant, context determination subsystem 188 can determine contextual autonomous vehicle data (e.g., stored in database 299 as described with respect to FIG. 2A) to determine context 288 for the conversation. As part of the conversation, conversation subsystem 186 can determine content 286 to be rendered for presentation to the remote communication participant throughout the conversation. Lastly, action subsystem 190 can determine an action 290 to be performed based on a result of the conversation.

In some implementations (e.g., as described with respect to FIGS. 7, 8A, and 8B), conversation subsystem 186 can engage in a conversation with a local communication participant based on input 282 received from initiation subsystem 182 indicating that the conversation should be initiated and conducted or indicating that the local communication participant has initiated the conversation. Input 282 can be determined based on, for example, an instance of sensor data generated by primary sensor system 130 of vehicle 100. Further, based on the instance of sensor data that was utilized to determine input 282, authentication subsystem 184 and/or conversation subsystem 186 can initially engage in the conversation with the local communication participant to authenticate the local communication participant. Moreover, and based on authentication 284 of the remote communication participant, context determination subsystem 188 can determine contextual autonomous vehicle data (e.g., stored in database 299 as described with respect to FIG. 2A) to determine context 288 for the conversation. As part of the conversation, conversation subsystem 186 can determine content 286 to be rendered for presentation to the local communication participant throughout the conversation. Lastly, action subsystem 190 can determine an action 290 to be performed based on a result of the conversation.

Additional description of these different types of conversations is provided herein with respect to the remaining FIGS. Accordingly, it should be noted that the overview of these conversations that are conducted using communications system 180 as described in connection with FIG. 2B is for the sake of example and is not meant to be limiting.

Figure 3:
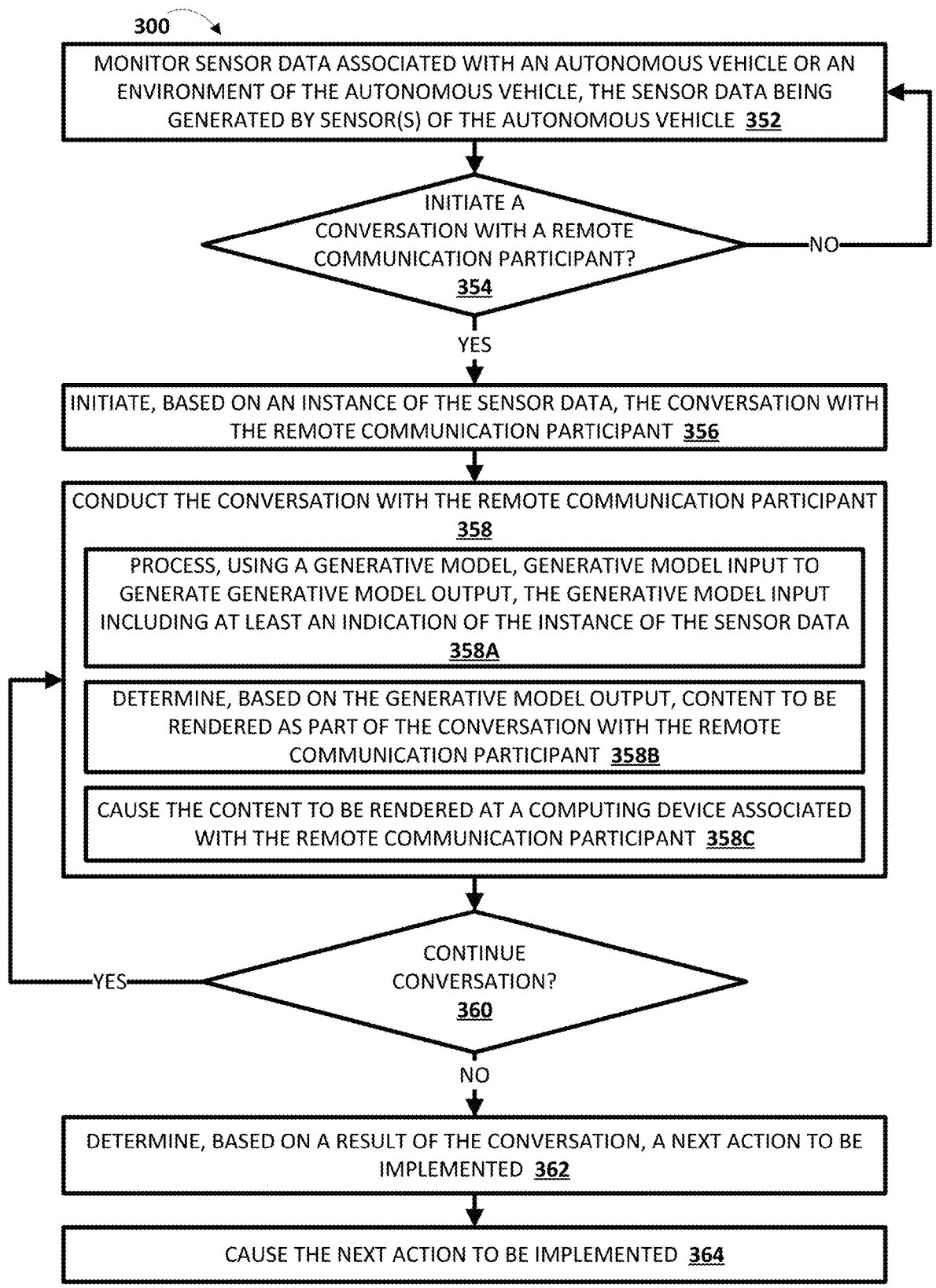
FIG. 3 is a flowchart depicting an example method of proactively conducting a conversation with a remote communication participant consistent with some implementations.

Turning now to FIG. 3, a flowchart illustrating an example method 300 of proactively conducting a conversation with a remote communication participant is depicted. For convenience, the operations of the method 300 are described with reference to a system that performs the operations. This system of the method 300 includes one or more processors, memory, and/or other component(s) of computing device(s) (e.g., vehicle 100 of FIG. 1, communications system 180 of FIG. 1, one or more servers, and/or other computing devices). Moreover, while operations of the method 300 are shown in a particular order, this is not meant to be limiting. One or more operations may be reordered, omitted, and/or added.

At block 352, the system monitors sensor data associated with an autonomous vehicle or an environment of the autonomous vehicle, the sensor data being generated by one or more sensors of the autonomous vehicle. For example, the system can monitor the sensor data generated by one or more of the sensors of primary sensor system 130 of vehicle 100.

At block 354, the system determines, based on an instance of the sensor data, whether to initiate a conversation with a remote communication participant. For example, the system can determine that the instance of the sensor data is indicative of a need to initiate the conversation with the remote communication participant. Further, the system can identify the remote communication participant based on a type of the instance of the sensor data. Various non-limiting examples of disparate types of the instance of the sensor data that result in different conversations with different remote communication participants being initiated and conducted are provided herein (e.g., with respect to FIGS. 4A, 4B, and 4C).

If, at an iteration of block 354, the system determines not to initiate a conversation with a remote communication participant, then the system returns to the operations of block 352 and continues to monitor the sensor data associated with the autonomous vehicle or the environment of the autonomous vehicle. Further, the system continues to determine, based on subsequent instances of the sensor data, whether to initiate a conversation with a remote communication participant at a subsequent iteration of block 354. If, at an iteration of block 354, the system determines to initiate a conversation with a remote communication participant, then the system proceeds to the operations of block 356.

At block 356, the system initiates, based on an instance of the sensor data, the conversation with the remote communication participant. For example, the system can access one or more databases to determine a telephone number associated with the remote communication participant and initiate the conversation as a telephone call directed to the remote communication participant. As another example, the system can access one or more databases to determine a software application or platform through which the system can engage in the conversation with the remote communication participant. Put another way, the system can utilize various communication channels to establish connection(s) for initiating and conducting conversations.

At block 358, the system conducts the conversation with the remote communication participant. For example, at sub-block 358A, the system processes, using a generative model, generative model input to generate generative model output, the generative model input including at least an indication of the instance of the sensor data. Further, at sub-block 358B, the system determines, based on the generative model output, content to be rendered as part of the conversation with the remote communication participant. Moreover, at sub-block 358C, the system causes the content to be rendered at a computing device associated with the remote communication participant.

For instance, and referring briefly back to FIG. 2B, input engine 280A of conversation subsystem 186 can generate the generative model input that includes at least the instance of the sensor data, and optionally a prompt or instructions to generate content to be rendered during a conversation with the remote communication participant (e.g., "what should I do based on detecting [particular instance of [sensor data?"), and optionally contextual autonomous vehicle data that can be determined based on a type of the remote communication participant. In the above instance, the "[particular instance of sensor data]" can correspond to any instance of sensor data being generated by one or more sensors of the autonomous vehicle. Notably, the generative model input can be a formatted version of at least the instance of the sensor data that is suitable for processing by the generative model (e.g., a tokenized version of the instance of the sensor data). Further, processing engine 280B of conversation subsystem 186 can process, using the generative model, the generative model input to generate the generative model output. Moreover, output engine 280C of conversation subsystem 186 can determine, based on the generative model output, the content to be rendered as part of the conversation. Notably, the generative model output can include the content to be rendered as part of the conversation or a probability distribution over a sequence of tokens based on which the content to be rendered as part of the conversation can be determined. Lastly, conversation subsystem 186 can cause the content to be visually and/or audibly rendered at a computing device associated with the remote communication participant (e.g., via output component(s) of the computing device associated with the remote communication participant, such as speaker(s) of the computing device, a display of the computing device, etc.).

At block 360, the system determines whether to continue the conversation with the remote communication participant. The system can determine whether to continue the conversation with the remote communication participant based on, for example, additional content that is received from the remote communication participant as part of the conversation. The additional content can be processed by the system, and can be captured in, for example, text-based input(s) received from the additional computing device associated with the remote communication participant, audio-based input(s) received from the additional computing device associated with the remote communication participant, vision-based input(s) received from the additional computing device associated with the remote communication participant, etc.

As described herein, the generative model may be a multi-modal generative model that is capable of processing text-based input(s), audio-based input(s), vision-based input(s), and etc., and capable of generating text-based output(s), audio-based output(s), vision-based output(s), etc. Accordingly, it should be understood that conversation subsystem 186 can optionally utilize additional machine learning model(s) to help facilitate the conversations described herein. For instance, in implementations where the conversation is a voice-based conversation and the content is captured in a text-based output, conversation subsystem 186 can utilize a text-to-speech model to generate synthesized speech audio data capturing synthesized speech corresponding to the content which can then be rendered at the computing device associated with the remote communication participant. In contrast, in implementations where the conversation is a voice-based conversation and the content is captured in an audio-based output, conversation subsystem 186 can directly output the audio-based output at the computing device associated with the remote communication participant. Also, for instance, in implementations where the conversation is a voice-based conversation and the additional content is captured in an audio-based input received from the additional computing device associated with the remote communication participant (e.g., audio data that is generated by microphone(s) of the computing device associated with the remote communication participant), conversation subsystem 186 can utilize an automatic speech recognition model to recognize text corresponding to the additional content, and conversation subsystem 186 can further process the recognized text to determine whether to continue the conversation.

If, at an iteration of block 360, the system determines to continue the conversation with the remote communication participant, then the system returns to the operations of block 358. In returning to the operations of block 358, the system can perform an additional iteration of the operations of sub-blocks 358A, 358B, and 358C. However, additional generative model input that is processed at this additional iteration of the operations of sub-blocks 358A may differ from the generative model input that was initially processed at the initial iteration of the operations of sub-block 358A. For instance, the additional generative model input can further include the additional content that is received from the remote communication participant as part of the conversation, and can optionally include additional, or alternative, contextual autonomous vehicle data that is determined based on the additional content that is received from the remote communication participant as part of the conversation. In instances where the additional generative model input includes the additional, or alternative, contextual autonomous vehicle data, the system can identify at least some of the additional, or alternative, contextual autonomous vehicle data based on the recognized text corresponding to the additional content. For instance, the system can identify landmarks or road names to include in the additional, or alternative, contextual autonomous vehicle data based on localization data from localization subsystem 152 and/or atlas data from atlas subsystem 160 when the recognized text corresponding to the additional context relates to a past, current, or future location of the autonomous vehicle. Also, for instance, the system can identify additional instances of sensor data to include in the additional, or alternative, contextual autonomous vehicle data based on primary sensor data from primary sensors system 130 when the recognized text corresponding to the additional context relates to a state of the autonomous vehicle or an environment of the autonomous vehicle. The system can continue performing iterations of the operations of blocks 358 and 360 until the system determines not to continue the conversation.

If, at an iteration of block 360, the system determines not to continue the conversation with the remote communication participant, then the system proceeds to the operations of block 362. At block 362, the system determines, based on a result of the conversation, a next action to be implemented. At block 364, the system causes the next action to be implemented. It should be understood that the result of the conversation and/or the next action to be implemented based on the result of the conversation can vary greatly based on the conversation, the content that is rendered as part of the conversation, and/or the additional content that is received from the remote communication participant as part of the conversation. Some non-limiting examples of the next action to be implemented can include, for instance, initiating and conducting conversation(s) with additional remote communication participant(s), modifying control of the autonomous vehicle, generating structured data from unstructured data that is received as part of the conversation (e.g., as described with respect to FIG. 2A), and/or other actions that can be performed by the autonomous vehicle.

Figure 4A:
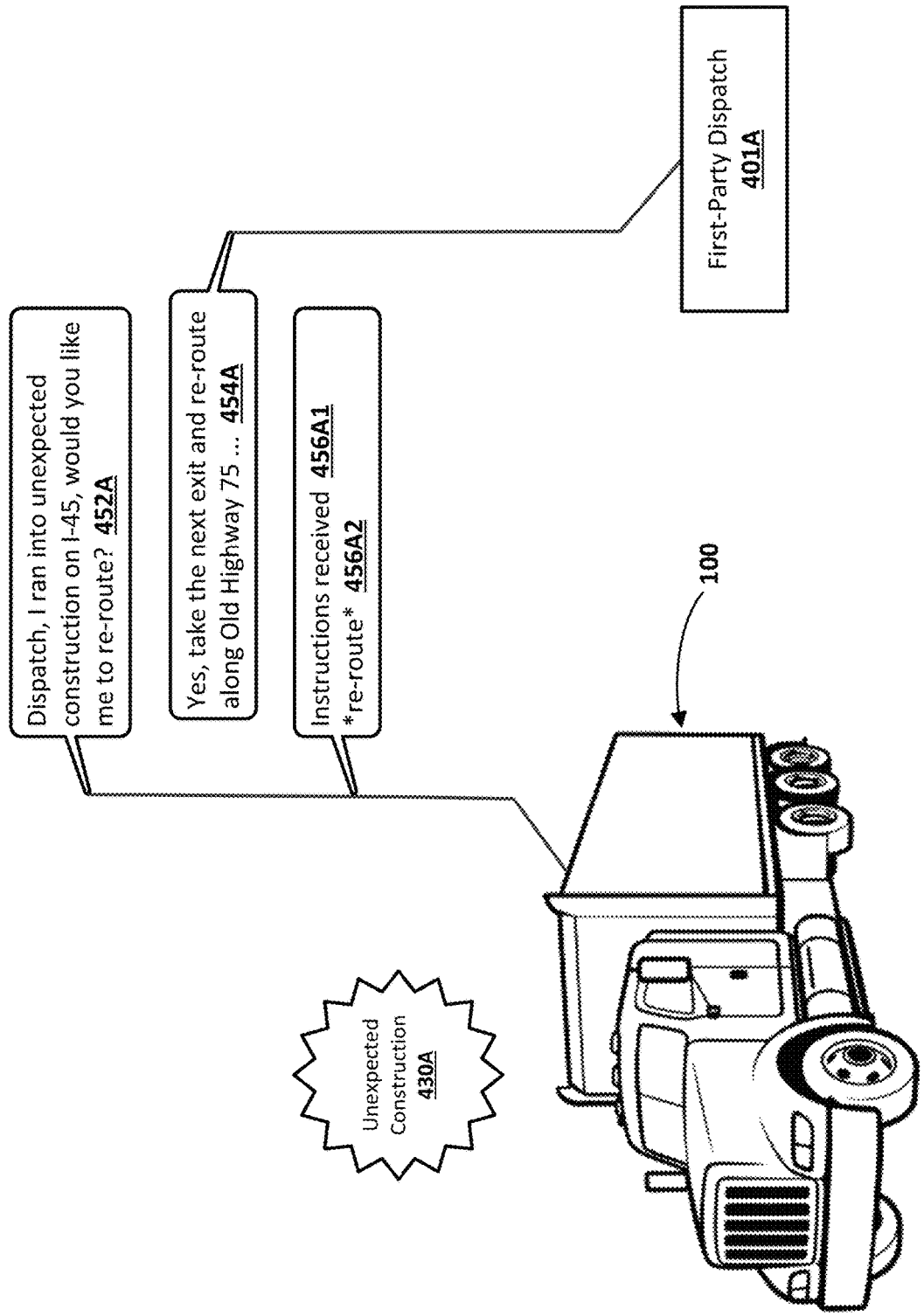
FIGS. 4A, 4B, and 4C depict non-limiting examples of proactively conducting a conversation with a remote communication participant as described with respect to FIG. 3.
Figure 4B:
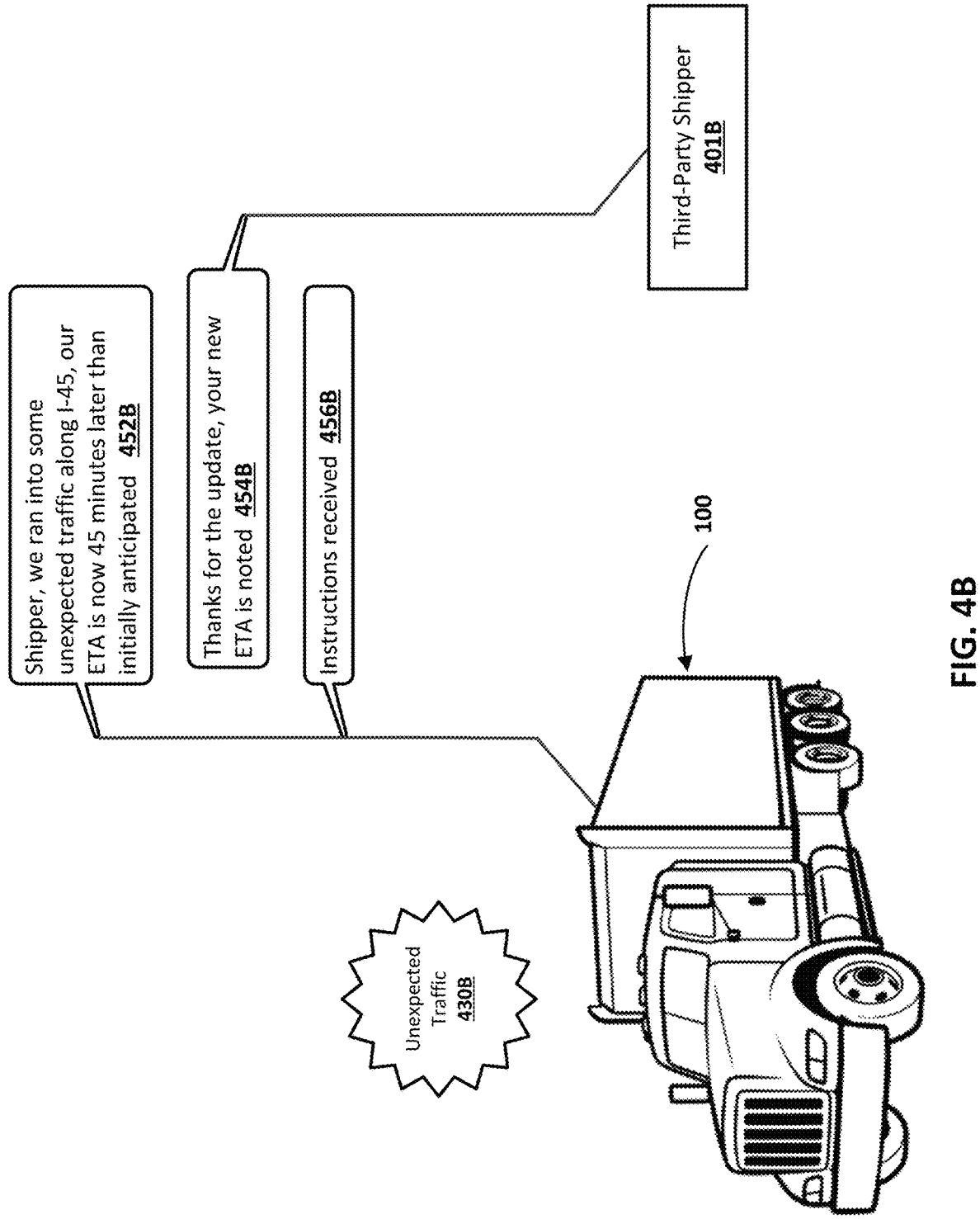
Figure 4C:
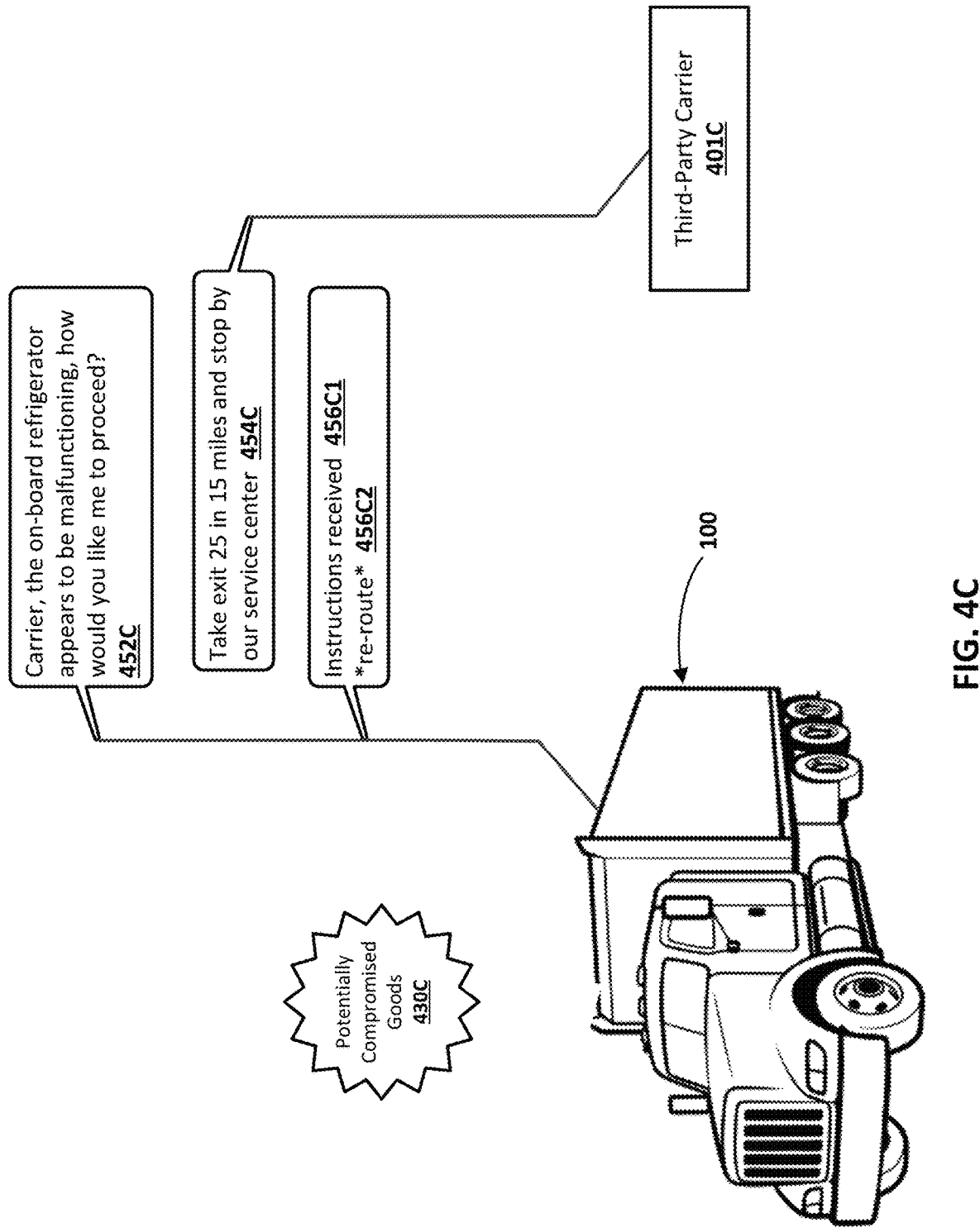

Turning now to FIGS. 4A, 4B, and 4C, non-limiting examples of proactively conducting a conversation with a remote communication participant as described with respect to FIG. 3 is depicted. Referring specifically to FIG. 4A, assume that an instance of perception sensor data (e.g., generated by RADAR 134, LIDAR 136, camera(s) 138, and/or other perception sensors of vehicle 100) detects unexpected construction as indicated at 430A. Further assume that the instance of the perception data triggers initiating of a conversation with a first-party dispatch 401A. In this example, vehicle 100 (e.g., via the system of the method 300 of FIG. 3) can identify a telephone number associated with the first-party dispatch 401A and initiate a telephone call with the first-party dispatch 401A using the telephone number. Notably, an instance of vehicle 100 is depicted throughout FIGS. 4A, 4B, and 4C as a tractor-trailer. However, it should be understood that is for the sake of example and is not meant to be limiting.

Further, and based on processing, using a generative model, generative model input that includes at least the instance of the perception sensor data, vehicle 100 can generate content 452A of "Dispatch, I ran into unexpected construction on I-45, would you like me to re-route" and cause the content 452A to be rendered at a computing device associated with the first-party dispatch 401A. In this example, the generative model input can further include any contextual autonomous vehicle data that can be accessed by the first-party dispatch 401A (e.g., all contextual autonomous vehicle data or a subset thereof). Further, additional content 454A of "Yes, take the next exit and re-route along Old Highway 75 . . . " can be received and processed to, for instance, determine a result of the conversation and/or a next action to be implemented based on the result of the conversation. In this example of FIG. 4A, and based on processing, using the generative model, additional generative model input that includes at least the additional content 454A, vehicle 100 can generate further additional content 456A1 of "Instructions received" and cause the further additional content 456A1 to be rendered at the computing device associated with the first-party dispatch 401A. Moreover, and as indicated at 456A2, the next action to be performed by vehicle 100 can include re-routing a navigation path as specified by the first-party dispatch 401A as part of the conversation.

While certain further additional content 456A1 is described with respect to FIG. 4A, it should be understood that is for the sake of example and is not meant to be limiting. For example, while vehicle 100 is communicating with the first-party dispatch 401A, vehicle 100 can continue processing sensor data and convey that sensor data to the first-party dispatch 401A. For instance, vehicle 100 can continue processing image(s) generated by camera(s) 138, using the generative model(s) described herein, to convey what vehicle 100 is seeing to the first-party dispatch 401A. Also, for instance, vehicle can continue processing other sensor data generated by other sensor(s) of primary sensors 130 and/or localization data from localization subsystem 152 and/or atlas data from atlas subsystem 160 to describe a location of vehicle 100 with respect to a map (e.g., a heading or the like). Vehicle 100 can continue doing so throughout the conversation with the first-party dispatch 100 such that vehicle 100 is providing periodic updates to the first-party dispatch 401A throughout the conversation. In some implementations, the conversation can be performed using a Voice over Internet Protocol communications channel, or the like, and can present these image(s), map(s), and/or other representations of other sensor data to the first-party dispatch 401A through these communication channels.

Referring specifically to FIG. 4B, assume that an instance of perception sensor data (e.g., generated by RADAR 134, LIDAR 136, camera(s) 138, and/or other perception sensors of vehicle 100) detects unexpected traffic as indicated at 430B. Further assume that planning subsystem 154 determines that the unexpected traffic will result in a delay of vehicle 100 arriving at a destination location, which triggers initiating of a conversation with a third-party shipper 401B that is associated with a payload of vehicle. In this example, vehicle 100 (e.g., via the system of the method 300 of FIG. 3) can identify a telephone number associated with the third-party shipper 401B and initiate a telephone call with the third-party shipper 401B using the telephone number.

Further, and based on processing, using a generative model, generative model input that includes at least the instance of the perception sensor data, vehicle 100 can generate content 452B of "Shipper, we ran into some unexpected traffic along I-45, our ETA is now 45 minutes later than initially anticipated" and cause the content 452B to be rendered at a computing device associated with the third-party shipper 401B. In this example, the generative model input can further include any contextual autonomous vehicle data that can be accessed by the third-party dispatcher 401B (e.g., a first subset of the contextual autonomous vehicle data). Further, additional content 454B of "Thanks for the update, your new ETA is noted" can be received and processed to, for instance, determine a result of the conversation and/or a next action to be implemented based on the result of the conversation. In this example of FIG. 4B, and based on processing, using the generative model, additional generative model input that includes at least the additional content 454B, vehicle 100 can generate further additional content 456B of "Instructions received" and cause the further additional content 456B to be rendered at the computing device associated with the third-party shipper 401B.

While certain further additional content 456B is described with respect to FIG. 4B, it should be understood that is for the sake of example and is not meant to be limiting. For example, while vehicle 100 is communicating with the third-party shipper 401B, vehicle 100 can continue processing sensor data and convey that sensor data to the third-party shipper 401B in the same or similar manner described above with respect to the first-party dispatch 401A in FIG. 4A.

Referring specifically to FIG. 4C, assume that an instance of sensor data detected via a controller area network (CAN) bus indicates that a refrigeration system of vehicle 100 is malfunctioning, which may result in potentially compromised goods as indicated at 430C. In this example, the refrigeration system of vehicle 100 may be owned and/or controlled by a carrier associated with a trailer of vehicle 100, but contain goods that are owned and/or controlled by a shipper. Further assume that the malfunctioning of the refrigeration system of vehicle 100 triggers the initiation of a conversation with a third-party carrier 401C that is associated with the trailer of vehicle 100. In this example, vehicle 100 (e.g., via the system of the method 300 of FIG. 3) can identify a telephone number associated with the third-party carrier 401C and initiate a telephone call with the third-party carrier 401C using the telephone number.

Further, and based on processing, using a generative model, generative model input that includes at least the instance of the sensor data, vehicle 100 can generate content 452C of "Carrier, the on-board refrigerator appears to be malfunctioning, how would you like me to proceed?" and cause the content 452C to be rendered at a computing device associated with the third-party carrier 401C. In this example, the generative model input can further include any contextual autonomous vehicle data that can be accessed by the third-party carrier 401C (e.g., a second subset of the contextual autonomous vehicle data that differs from the contextual autonomous vehicle data that can be accessed by the third-party dispatcher 401B in the example of FIG. 4B). Further, additional content 454C of "Take exit 25 in 15 miles and stop by our service center" can be received and processed to, for instance, determine a result of the conversation and/or a next action to be implemented based on the result of the conversation. In this example of FIG. 4C, and based on processing, using the generative model, additional generative model input that includes at least the additional content 454C, vehicle 100 can generate further additional content 456C1 of "Instructions received" and cause the further additional content 456C1 to be rendered at the computing device associated with the third-party carrier 401C. Moreover, and as indicated at 456C2, the next action to be performed by vehicle 100 can include re-routing a navigation path as specified by the third-party shipper 401C as part of the conversation. In this example, a first-party dispatch may be required to authorize the proposed re-routing of vehicle 100 as specified by the third-party shipper 401C.

While certain further additional content 456BC1 is described with respect to FIG. 4C, it should be understood that is for the sake of example and is not meant to be limiting. For example, while vehicle 100 is communicating with the third-party carrier 401C, vehicle 100 can continue processing sensor data and convey that sensor data to the third-party shipper 401C in the same or similar manner described above with respect to the first-party dispatch 401A in FIG. 4A.

Although the examples of FIGS. 4A-4C are described with respect to the conversations being telephonic conversations, it should be understood that is for the sake of illustrating various techniques contemplated herein and is not meant to be limiting. Rather, it should be understood that other forms of conversations with the remote communication participant can be conducted, such as text-based conversations via a text messaging application or other software application. Further, although the examples of FIGS. 4A-4C are described with respect to vehicle 100 initiating and conducting the telephonic conversations, it should be understood that is for the sake of illustrating various techniques contemplated herein and is not meant to be limiting. Rather, it should be understood that high performance server(s) in communication with vehicle 100 can initiate and conduct the conversations on behalf of vehicle 100. Moreover, although the examples of FIGS. 4A-4C are described with respect to particular next actions being implemented (e.g., re-routing of vehicle 100), it should be understood that is for the sake of illustrating various techniques contemplated herein and is not meant to be limiting. Rather, it should be understood that other actions can additionally, or alternatively, be implemented, such as initiating and conducting other conversations with other remote communication participants (e.g., in the examples of FIGS. 4A and 4C when vehicle 100 is re-routed and communicating this re-routing to other interested parties). Furthermore, although the examples of FIGS. 4A-4C are not described with respect to any authorization being performed as part of the conversations, it should be understood that is for the sake of brevity and is not meant to be limiting. Rather, it should be understood that various forms of authorization can be performed as part of the conversations to further ensure security of data associated with vehicle 100. Lastly, although the examples of FIGS. 4A-4C are described with respect to vehicle 100 only communicating information about itself and based on instances of sensor data, it should be understood that is for the sake of example and is not meant to be limiting. Rather, it should be understood that vehicle 100 can additionally, or alternatively, communicate future plans and/or control strategies to be taken based on the instances of the sensor data, communicate about a larger fleet of vehicles that includes vehicle 100, etc.

Figure 5:
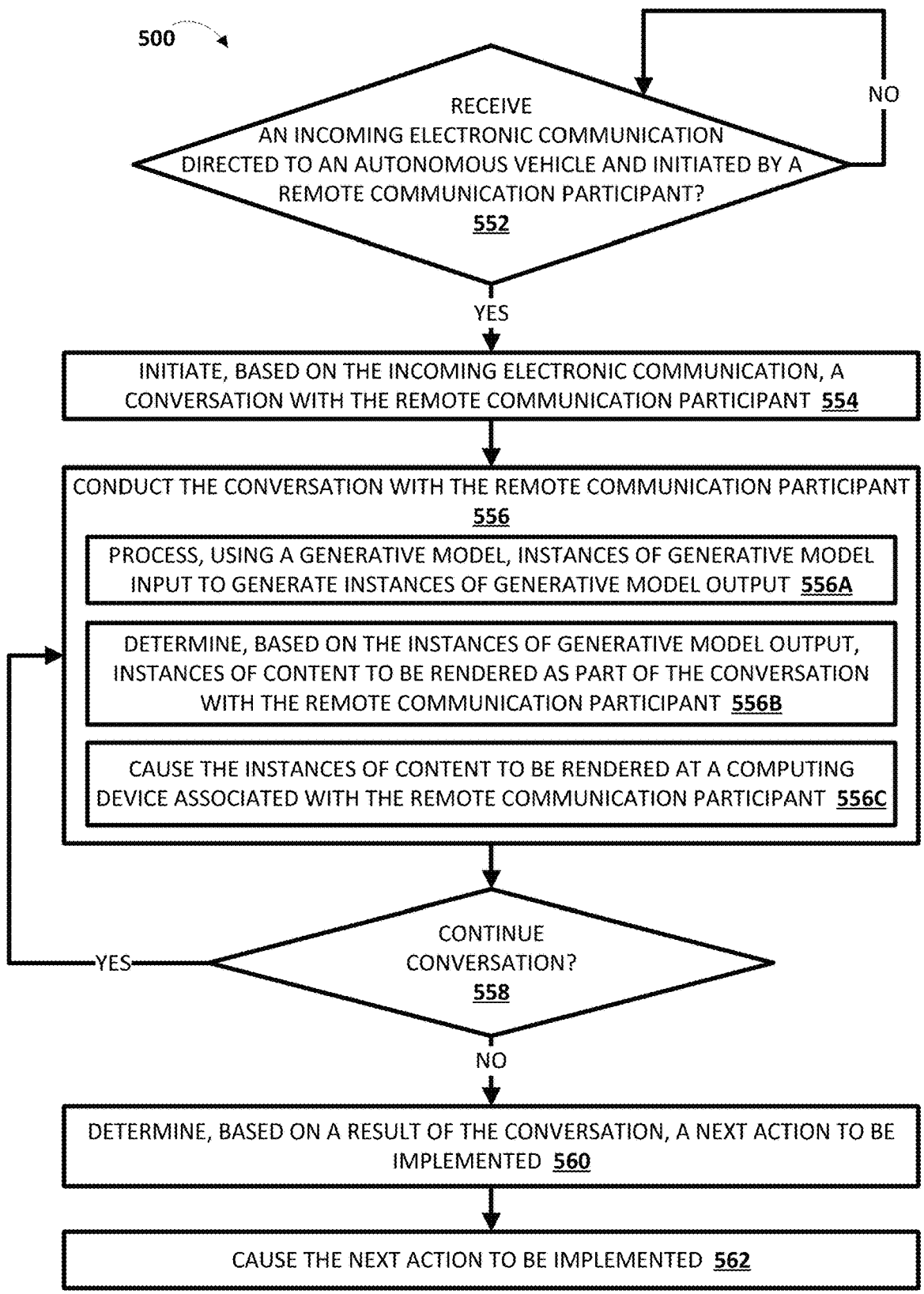
FIG. 5 is a flowchart depicting an example method of reactively conducting a conversation with a remote communication participant consistent with some implementations.

Turning now to FIG. 5, a flowchart illustrating an example method 500 of reactively conducting a conversation with a remote communication is depicted. For convenience, the operations of the method 500 are described with reference to a system that performs the operations. This system of the method 500 includes one or more processors, memory, and/or other component(s) of computing device(s) (e.g., vehicle 100 of FIG. 1, communications system 180 of FIG. 1, one or more servers, and/or other computing devices). Moreover, while operations of the method 500 are shown in a particular order, this is not meant to be limiting. One or more operations may be reordered, omitted, and/or added.

At block 552, the system determines whether an incoming electronic communication directed to an autonomous vehicle and initiated by a remote communication participant is received. The incoming electronic communication can be, for example, an incoming telephone call directed to the autonomous vehicle, an incoming text message directed to the autonomous vehicle, an incoming software application message directed to the autonomous vehicle, and/or other forms of electronic communications directed to the autonomous vehicle.

If, at an iteration of block 552, the system determines that no incoming electronic communication directed to an autonomous vehicle and initiated by a remote communication participant is received, then the system continues to monitor for receipt of the incoming electronic communication at block 552. If, at an iteration of block 552, the system determines that an incoming electronic communication directed to an autonomous vehicle and initiated by a remote communication participant is received, then the system proceeds to the operations of block 554.

At block 554, the system initiates, based on the incoming electronic communication, a conversation with the remote communication participant. For example, the system can initiate the conversation with the remote communication participant by establishing a communication session with a computing device of the remote communication participant and in response to receiving the incoming electronic communication from the remote communication participant.

At block 556, the system conducts the conversation with the remote communication participant. For example, at sub-block 556A, the system processes, using a generative model, instances of generative model input to generate instances of generative model output. Further, at sub-block 556B, the system determines, based on the instances of generative model output, instances of content to be rendered as part of the conversation with the remote communication participant. Moreover, at sub-block 556C, the system causes the instances of content to be rendered at a computing device associated with the remote communication participant.

For instance, and referring briefly back to FIG. 2B, input engine 280A of conversation subsystem 186 can generate an initial instance of generative model input, of the instances of the generative model input, that includes at least a prompt for authenticating the remote communication participant. Notably, the initial instance of the generative model input can be a formatted version of the prompt that is suitable for processing by the generative model (e.g., a tokenized version of the prompt). Further, processing engine 280B of conversation subsystem 186 can process, using the generative model, the initial instance of the generative model input to generate an initial instance of the generative model output, of the instances of the generative model output. Moreover, output engine 280C of conversation subsystem 186 can determine, based on the initial instance of the generative model output, an initial instance of the content to be rendered as part of the conversation. Lastly, conversation subsystem 186 can cause the initial instance of the content to be visually and/or audibly rendered at a computing device associated with the remote communication participant (e.g., via output component(s) of the computing device associated with the remote communication participant, such as speaker(s) of the computing device, a display of the computing device, etc.).

Accordingly, the initial instance of the content can include a request to authenticate the remote communication participant upon initiating the conversation. The request to authenticate the remote communication participant can request that the remote communication participant complete one or more of: short message service token authentication by verifying a text-based code sent to the computing device of the remote communication participant via SMS, email token authentication by verifying a text-based code sent to an email account associated with the remote communication participant via email, hardware token authentication by entering a passcode and actuating a hardware or software button, software token authentication by entering a passcode that is variable over time, biometric authentication by voice identification or face identification, password authentication by entering a passcode that is static over time, or personal identification number authentication by entering a PIN number when prompted at the computing device. Notably, and based on authentication of the remote communication participant, the system can dynamically adapt the contextual autonomous vehicle data that is subsequently utilized as part of the conversation.

At block 558, the system determines whether to continue the conversation with the remote communication participant. For example, and assuming that the remote communication participant is authenticated responsive to the initial instance of the content being rendered at the computing device associated with the remote communication participant, the system can determine to continue the conversation with the remote communication participant. If, at an iteration of block 558, the system determines to continue the conversation with the remote communication participant, then the system returns to the operations of block 556. In returning to the operations of block 556, the system can perform an additional iteration of the operations of sub-blocks 556A, 556B, and 556C. However, an additional instance of the generative model input, of the instances of the generative model input, that is processed at this additional iteration of the operations of sub-blocks 556A may differ than the initial instance of the generative model input that was initially processed at the initial iteration of the operations of sub-block 556A. For instance, the additional instance of the generative model input can further include contextual autonomous vehicle data that is tailored to the authentication of the remote communication participant that initiated the incoming electronic communication. The system can continue performing iterations of the operations of blocks 556 and 558 until the system determines not to continue the conversation.

If, at an iteration of block 558, the system determines not to continue the conversation with the remote communication participant, then the system proceeds to the operations of block 560. At block 560, the system determines, based on a result of the conversation, a next action to be implemented. At block 562, the system causes the next action to be implemented. It should be understood that the result of the conversation and/or the next action to be implemented based on the result of the conversation can vary greatly based on the conversation, the content that is rendered as part of the conversation, and/or the additional content that is received from the remote communication participant as part of the conversation.

Turning now to FIGS. 6A, 6B, 6C, and 6D, non-limiting examples of reactively conducting a conversation with a remote communication participant as described with respect to FIG. 5 are depicted. Notably, an instance of vehicle 100 is depicted throughout FIGS. 6A, 6B, 6C, and 6D as a tractor-trailer. However, it should be understood that is for the sake of example and is not meant to be limiting.

Referring specifically to FIG. 6A, assume that an incoming electronic communication is received at vehicle 100 as indicated at 630A and from a first-party dispatch 601A. Further assume that content 652A of "Our fleet intelligence indicates there is some upcoming unexpected construction, take the next exit and re-route along Old Highway 75 . . . " is received in response to vehicle 100 initiating a conversation responsive to receiving the incoming electronic communication. In this example, and in response to initiating the electronic communication, vehicle 100 can authenticate the first-party dispatch 601A as indicated at 654A1 and using any authentication technique, or combination of authentication techniques, described herein. Further assuming that the first-party dispatch 601A is properly authenticated as indicated at 654A1, vehicle 100 can generate, based on processing, using a generative model, an instance of generative model input that includes at least the content 652A (and optionally any contextual autonomous vehicle data accessible by the first-party dispatch 601A), additional content 654A2 of "Instructions received" and cause the additional content 652A2 to be rendered at the computing device associated with the first-party dispatch 601A. Moreover, and as indicated at 654A3, the next action to be performed by vehicle 100 can include re-routing a navigation path as specified by the first-party dispatch 601A as part of the conversation.

In the example of FIG. 6A, any contextual autonomous vehicle data that is included in the instance of the generative model input can include any structured data (e.g., described with respect to FIG. 2A). As noted above, a first-party entity is an entity that develops, maintains, and/or controls primary vehicle control system 120 and the first-party dispatch 601A is also associated with the first-party entity. Put another way, the first-party dispatch 601A is associated with the same entity that causes vehicle 100 to be controlled and, as a result, can have access to any data associated with vehicle 100, a third-party shipper that is associated with vehicle 100

(e.g., as described with respect to FIG. 6B), a third-party carrier that is associated with vehicle 100 (e.g., as described with respect to FIG. 6C), and/or other parties.

Referring specifically to FIG. 6B, assume that an incoming electronic communication is received at vehicle 100 as indicated at 630B and from a third-party shipper 601B that owns and/or controls a payload of vehicle 100. Further assume that content 652B of "Was the payload within the allowable limit at the last weigh station?" is received in response to vehicle 100 initiating a conversation responsive to receiving the incoming electronic communication. In this example, and in response to initiating the electronic communication, vehicle 100 can authenticate the third-party shipper 601B as indicated at 654B1 and using any authentication technique, or combination of authentication techniques, described herein. Further assuming that the third-party shipper 601B is properly authenticated as indicated at 654B1, vehicle 100 can generate, based on processing, using a generative model, an instance of generative model input that includes at least the content 652B (and optionally a first subset of contextual autonomous vehicle data accessible by the third-party shipper 601B), additional content 654B2 of "Yes, the gross weight was within the allowable limit at the last weigh station" and cause the additional content 652B2 to be rendered at the computing device associated with the third-party shipper 601C. Notably, the information associated with the last weigh station may initially be available as structured data (e.g., generated as described with respect to FIG. 2A) and included in the first subset of contextual autonomous vehicle data that is processed along with the content 652B to generate the additional content 652B2.

In the example of FIG. 6B, any contextual autonomous vehicle data that is included in the instance of the generative model input can include only a subset of structured data (e.g., described with respect to FIG. 2A). As noted above, a third-party entity is an entity that is separate from a first-party entity that develops, maintains, and/or controls primary vehicle control system 120 and the third-party shipper 601B is not associated with the first-party entity. Put another way, the third-party shipper 601B is in addition to entity that causes vehicle 100 to be controlled and, as a result, can only have no/limited access to data associated with vehicle 100 and no/limited access to a third-party carrier that is associated with vehicle 100 (e.g., as described with respect to FIG. 6C), and/or other parties. Some non-limiting examples of the subset of the contextual autonomous vehicle data that can be utilized in communicating with the third-party shipper 601B includes contents of a payload of vehicle 100, a current location of vehicle 100, a weight of vehicle 100 and its payload, a condition of a trailer being pulled by vehicle, and some other contextual autonomous vehicle data. However, the subset of the contextual autonomous vehicle data that cannot be utilized in communicating with the third-party shipper 601B may not include proprietary operational data of vehicle 100, contractual or transactional data between the first-party entity and a third-party carrier, and some other contextual autonomous vehicle data.

Referring specifically to FIG. 6C, assume that an incoming electronic communication is received at vehicle 100 as indicated at 630C and from a third-party carrier 601C that owns and/or controls a trailer of vehicle 100. Further assume that content 652C of "Upon arriving at the delivery yard, please proceed to . . . " is received in response to vehicle 100 initiating a conversation responsive to receiving the incoming electronic communication. In this example, and in response to initiating the electronic communication, vehicle 100 can authenticate the third-party carrier 601C as indicated at 654C1 and using any authentication technique, or combination of authentication techniques, described herein. Further assuming that the third-party carrier 601C is properly authenticated as indicated at 654C1, vehicle 100 can generate, based on processing, using a generative model, an instance of generative model input that includes at least the content 652C (and optionally a second subset of contextual autonomous vehicle data accessible by the third-party carrier 601C), additional content 654C2 of "Instructions received" and cause the additional content 652C2 to be rendered at the computing device associated with the third-party carrier 601C. Notably, the information included in the content 652C can be stored as indicated at 654C3 and influence future control of vehicle 100, such that, upon arriving at the delivery yard, control of vehicle 100 can be adapted based on instructions that were provided in natural language via the content 652C.

In the example of FIG. 6C, any contextual autonomous vehicle data that is included in the instance of the generative model input can include only a subset of structured data (e.g., described with respect to FIG. 2A). As noted above, a third-party entity is an entity that is separate from a first-party entity that develops, maintains, and/or controls primary vehicle control system 120 and the third-party carrier 601C is not associated with the first-party entity. Put another way, the third-party carrier 601C is in addition to entity that causes vehicle 100 to be controlled and, as a result, can only have no/limited access to data associated with vehicle 100 and no/limited access to a third-party shipper that is associated with vehicle 100 (e.g., as described with respect to FIG. 6B), and/or other parties. Some non-limiting examples of the subset of the contextual autonomous vehicle data that can be utilized in communicating with the third-party carrier 601C includes contents of a payload of vehicle 100, a current location of vehicle 100, proprietary operational data of vehicle 100, and some other contextual autonomous vehicle data. However, the subset of the contextual autonomous vehicle data that cannot be utilized in communicating with the third-party carrier 601C may not include contractual or transactional data between the first-party entity and a third-party shipper, and some other contextual autonomous vehicle data.

Referring specifically to FIG. 6D, assume that an incoming electronic communication is received at vehicle 100 as indicated at 630D and from an unknown party 601D. Further assume that content 652D of "What payload are you carrying today?" is received in response to vehicle 100 initiating a conversation responsive to receiving the incoming electronic communication. In this example, and in response to initiating the electronic communication, vehicle 100 can authenticate the unknown party 601D and using any authentication technique, or combination of authentication techniques, described herein. However, in contrast with the examples of FIGS. 6A-6C, further assume that the unknown party 601D is not properly authenticated as indicated at 654D1. In this example, vehicle 100 can generate, based on processing, using a generative model, an instance of generative model input that includes at least an indication that the unknown party 601D is not authenticated, additional content 654D2 of "Goodbye" and cause the additional content 652D2 to be rendered at the computing device associated with the unknown party 601D, then terminate the conversation. Notably, in this example, the incoming electronic communication could be a nefarious attack by the unknown party 601D that is attempting to determine the payload of vehicle 100. Thus, vehicle 100 can refrain from engaging in the conversation to reduce and/or eliminate the likelihood of any nefarious attack by the unknown party 601D.

In some implementations, and in response to determining that the incoming electronic communication could be a nefarious attack by the unknown party 601D, vehicle 100 can take countermeasure(s) to mitigate occurrences of nefarious attacks in the future. For instance, vehicle 100 can perform an onboard configuration update to change communication ports, security keys, application programming interfaces to communicate with vehicle 100, and/or other configuration updates. In additional or alternative implementations, vehicle 100 can communicate with other vehicles in a fleet of autonomous vehicles to make them aware of the nefarious attack and optionally cause one or more of these other vehicles in the fleet to perform the same or similar onboard configuration update. In some of those additional or alternative implementations, the other vehicles in the fleet with which vehicle 100 communicates this information to can be limited to those within a threshold distance of vehicle 100, or within a threshold distance of a route of vehicle 100, since it is likely any nefarious attack could be carried out within the same or similar geographical region.

In implementations where vehicle 100 (or other vehicles in the fleet) do perform an onboard configuration update as described above, this can be utilized as another signal to initiate conversations with remote communication participants. For instance, vehicle 100 can also make the remote communication participants described herein aware of the nefarious attack and provide information about the changed communication ports, security keys, application programming interfaces, and/or other configuration updates. This enables these remote communication participants to subsequently initiate communications with vehicle 100 while still mitigating occurrences of nefarious attacks in the future.

Although the examples of FIGS. 6A-6D are described with respect to the conversations being telephonic conversations, it should be understood that is for the sake of illustrating various techniques contemplated herein and is not meant to be limiting. Rather, it should be understood that other forms of conversations with the remote communication participant can be conducted, such as text-based conversations via a text messaging application or other software application. Further, although the examples of FIGS. 6A-6D are described with respect to vehicle 100 conducting the telephonic conversations based on received incoming electronic communications, it should be understood that is for the sake of illustrating various techniques contemplated herein and is not meant to be limiting. Rather, it should be understood that high performance server(s) in communication with vehicle 100 can conduct the conversations on behalf of vehicle 100. Moreover, although the examples of FIGS. 6A-6D are described with respect to particular next actions being implemented (e.g., re-routing of vehicle 100, storing instructions for future control of vehicle 100, etc.), it should be understood that is for the sake of illustrating various techniques contemplated herein and is not meant to be limiting. Rather, it should be understood that other actions can additionally, or alternatively, be implemented, such as initiating and conducting other conversations with other remote communication participants (e.g., in the examples of FIGS. 6A and 6C when vehicle 100 is re-routed and/or future control of vehicle 100 is influenced based on instructions received from the remote communication participant). Furthermore, although the examples of FIGS. 6A-6D assume that the remote communication participant is authenticated or not authenticated, it should be understood that is for the sake of brevity and to illustrate various techniques contemplated herein. Rather, it should be understood that some dialog of the conversations may relate to the authentication such that vehicle 100 may not engage in substantive conversation without this authentication. Lastly, although the examples of FIGS. 6A-6D are described with respect to vehicle 100 only communicating information about itself and based on inquiries about historical activity of vehicle 100, it should be understood that is for the sake of example and is not meant to be limiting. Rather, it should be understood that vehicle 100 can additionally, or alternatively, communicate future plans and/or control strategies to be taken, communicate about a larger fleet of vehicles that includes vehicle 100, etc.

Turning now to FIG. 7, a flowchart illustrating an example method 700 of conducting a conversation with a local communication participant is depicted. For convenience, the operations of the method 700 are described with reference to a system that performs the operations. This system of the method 700 includes one or more processors, memory, and/or other component(s) of computing device(s) (e.g., vehicle 100 of FIG. 1, communications system 180 of FIG. 1, one or more servers, and/or other computing devices). Moreover, while operations of the method 700 are shown in a particular order, this is not meant to be limiting. One or more operations may be reordered, omitted, and/or added.

At block 752, the system monitors sensor data associated with an autonomous vehicle or an environment of the autonomous vehicle, the sensor data being generated by one or more sensors of the autonomous vehicle. For example, the system can monitor the sensor data generated by one or more of the sensors of primary sensor system 130 of vehicle 100.

At block 754, the system determines, based on an instance of the sensor data, whether to initiate a conversation with a local communication participant. For example, the system can determine that the instance of the sensor data is indicative of a need to initiate the conversation with the local communication participant, can determine that the instance of the sensor data is indicative of the local communication participant attempting to access the autonomous vehicle or component(s) of the autonomous vehicle, etc.

If, at an iteration of block 754, the system determines not to initiate a conversation with a local communication participant, then the system returns to the operations of block 752 and continues to monitor the sensor data associated with the autonomous vehicle or the environment of the autonomous vehicle. Further, the system continues to determine, based on a subsequent instance of the sensor data, whether to initiate a conversation with a local communication participant at a subsequent iteration of block 754. If, at an iteration of block 754, the system determines to initiate a conversation with a local communication participant, then the system proceeds to the operations of block 756.

At block 756, the system initiates, based on an instance of the sensor data, the conversation with the local communication participant. For example, the system can initiate the conversation with the local communication participant via a computing device of the autonomous vehicle (e.g., on a door of the autonomous vehicle or otherwise integral to the autonomous vehicle) or an additional computing device of the local communication participant.

At block 758, the system conducts the conversation with the local communication participant. For example, at sub-block 778A, the system processes, using a generative model, instances of generative model input to generate instances of generative model output. Further, at sub-block 778B, the system determines, based on the instances of generative model output, instances of content to be rendered as part of the conversation with the local communication participant. Moreover, at sub-block 778C, the system causes the instances of content to be rendered at a computing device of the autonomous vehicle or an additional computing device associated with the local communication participant.

For instance, and referring briefly back to FIG. 2B, input engine 280A of conversation subsystem 186 can generate an initial instance of generative model input, of the instances of the generative model input, that includes at least a prompt for authenticating the local communication participant. Notably, the initial instance of the generative model input can be a formatted version of the prompt that is suitable for processing by the generative model (e.g., a tokenized version of the prompt). Further, processing engine 280B of conversation subsystem 186 can process, using the generative model, the initial instance of the generative model input to generate an initial instance of the generative model output, of the instances of the generative model output. Moreover, output engine 280C of conversation subsystem 186 can determine, based on the initial instance of the generative model output, an initial instance of the content to be rendered as part of the conversation. Lastly, conversation subsystem 186 can cause the initial instance of the content to be visually and/or audibly rendered at a computing device of the autonomous vehicle and/or an additional computing device associated with the local communication participant (e.g., via output component(s) of the respective computing devices, such as speaker(s), a display, etc.).

Accordingly, the initial instance of the content can include a request to authenticate the local communication participant. The request to authenticate the local communication participant can request that the local communication participant complete one or more of: short message service token authentication by verifying a text-based code sent to the additional computing device of the remote communication participant via SMS, email token authentication by verifying a text-based code sent to an email account associated with the remote communication participant via email, hardware token authentication by entering a passcode and actuating a hardware or software button, software token authentication by entering a passcode that is variable over time, biometric authentication by voice identification or face identification, password authentication by entering a passcode that is static over time, or personal identification number authentication by entering a personal identification number when prompted at the computing device. Notably, and based on authentication of the remote communication participant, the system can dynamically adapt the contextual autonomous vehicle data that is subsequently utilized as part of the conversation.

At block 760, the system determines whether to continue the conversation with the local communication participant. For example, and assuming that the local communication participant is authenticated and responsive to the initial instance of the content being rendered at the computing device of the autonomous vehicle or the additional computing device associated with the local communication participant, the system can determine to continue the conversation with the local communication participant. If, at an iteration of block 760, the system determines to continue the conversation with the local communication participant, then the system returns to the operations of block 758. In returning to the operations of block 758, the system can perform an additional iteration of the operations of sub-blocks 758A, 758B, and 758C. However, an additional instance of the generative model input, of the instances of the generative model input, that is processed at this additional iteration of the operations of sub-blocks 758A may differ than the initial instance of the generative model input that was initially processed at the initial iteration of the operations of sub-block 758A. For instance, the additional instance of the generative model input can further include contextual autonomous vehicle data that is tailored to the authentication of the local communication participant. In situations where the local communication participant is associated with a first-party entity (e.g., a person servicing the autonomous vehicle that is associated with the first-party entity), the contextual autonomous vehicle data that is tailored to the authentication of the local communication participant can include any contextual information available to a first-party entity. However, in situations where the local communication participant is associated with a particular third-party entity (e.g., a person at a weigh station that is not associated with the first-party entity), the contextual autonomous vehicle data that is tailored to the authentication of the local communication participant can be limited to less than all contextual autonomous vehicle data that is available to the first-party entity. The system can continue performing iterations of the operations of blocks 758 and 760 until the system determines not to continue the conversation.

If, at an iteration of block 760, the system determines not to continue the conversation with the local communication participant, then the system proceeds to the operations of block 762. At block 762, the system determines, based on a result of the conversation, a next action to be implemented. At block 764, the system causes the next action to be implemented. It should be understood that the result of the conversation and/or the next action to be implemented based on the result of the conversation can vary greatly based on the conversation, the content that is rendered as part of the conversation, and/or the additional content that is received from the local communication participant as part of the conversation. Some non-limiting examples of the next action to be implemented can include, for instance, initiating and conducting conversation(s) with remote communication participant(s), granting access to the autonomous vehicle or component(s) thereof, and/or other actions that can be performed by the autonomous vehicle.

Turning now to FIGS. 8A and 8B, non-limiting examples of conducting a conversation with a local communication participant as described with respect to FIG. 7 are depicted. Notably, an instance of vehicle 100 is depicted throughout FIGS. 8A and 8B as a tractor-trailer. However, it should be understood that is for the sake of example and is not meant to be limiting.

Referring specifically to FIG. 8A, assume that maintenance has been performed on vehicle 100 and perception subsystem 156 detects a maintenance provider 801A interacting with vehicle by providing content 852A of "Your maintenance is complete, can I access the cabin to update the maintenance log in the glove box?". In this example, and in response to detecting the content 852A, vehicle 100 can authenticate the maintenance provider 801A as indicated at 854A1 and using any authentication technique, or combination of authentication techniques, described herein. Further assuming that the maintenance provider 801A is properly authenticated as indicated at 854A1, vehicle 100 can generate, based on processing, using a generative model, an instance of generative model input that includes at least the content 852A (and optionally any contextual autonomous vehicle data accessible by the maintenance provider 801A), additional content 854A2 of "Access granted" and cause the additional content 854A2 to be rendered at a computing device of vehicle 100 and/or an additional computing device associated with the maintenance provider 801A. Moreover, and as indicated at 854A3, the next action to be performed by vehicle 100 can include unlocking the cabin of vehicle 100 and/or a glove box of vehicle 100. In some implementations, vehicle 100 can further generate, based on processing, using the generative model, an additional instance of generative model input that includes at least an indication of the next action that will be, or was, performed as contextual autonomous vehicle data to generate further additional content indicative of the next action. In these implementations, the further additional content can be rendered to alert the maintenance provider of the next action since it may not be readily apparent, for example, when the cabin is unlocked, when the glovebox is unlocked, etc. Notably, in the example of FIG. 8A, the conversation is initiated by the maintenance provider 801A. However, that is not meant to be limiting.

Referring specifically to FIG. 8B, assume that vehicle 100 has stopped at a fuel station and needs to be re-fueled, and assume that perception system 156 detects an attendant 801B that is locationally proximate to vehicle 100. In this example, and based on processing, using a generative model, generative model input that includes at least the instance of perception sensor data indicating that the attendant 801B is locationally proximate to vehicle 100, vehicle 100 can generate content 852B of "I'm low on fuel. Attendant, can you help me re-fuel?" and cause the content 852B to be rendered at a computing device of vehicle 100 or an additional computing device associated with the attendant 801B. In this example, the generative model input can further include any contextual autonomous vehicle data that can be accessed by the attendance 801B (if any). Further, additional content 854B of "Yes, please provide access to your fuel port" can be received, and vehicle 100 can authenticate the attendant 801B as indicated at 856B1 and using any authentication technique, or combination of authentication techniques, described herein. Further assuming that the attendant 801B is properly authenticated as indicated at 856B1, vehicle 100 can generate, based on processing, using a generative model, an instance of generative model input that includes at least the content 854B (and optionally any contextual autonomous vehicle data accessible by the attendant 801B), further additional content 856B2 of "Access granted" and cause the further additional content 856B2 to be rendered at a computing device of vehicle 100 and/or an additional computing device associated with the attendant 801B. Moreover, and as indicated at 856B3, the next action to be performed by vehicle 100 can include unlocking the fuel port of vehicle 100.

Although the examples of FIGS. 8A-8B are described with respect to the conversations being voice-based conversations, it should be understood that is for the sake of illustrating various techniques contemplated herein and is not meant to be limiting. Rather, it should be understood that other forms of conversations with the local communication participant can be conducted, such as text-based conversations via the computing device of vehicle 100 or the additional computing devices of the local communication participants. Further, although the examples of FIGS. 8A-8B are described with respect to vehicle 100 conducting the conversations, it should be understood that is for the sake of illustrating various techniques contemplated herein and is not meant to be limiting. Rather, it should be understood that high performance server(s) in communication with vehicle 100 can conduct the conversations on behalf of vehicle 100.

Moreover, while certain non-limiting examples are described with respect to FIGS. 8A-8B are depicted, it should be understood that many other scenarios are contemplated herein. For instance, the local communication participant could be a law enforcement officer or another public safety official. In these instances, and upon authenticating the law enforcement officer or other public safety official, access could be granted to particular components of vehicle 100, additional communications could be made available to the law enforcement officer or other public safety official (e.g., communications with a first-party dispatcher that dispatched vehicle 100, a first-party teleassistant operator capable of controlling vehicle 100, and so on). In implementations where the additional communications are made available to the law enforcement officer or other public safety official, these communications can be conducted via a computing device of vehicle 100 or a computing device of the law enforcement officer or other public safety official. Also, for instance, the local communication participant could be a tow truck driver or other party that needs to move vehicle 100 in a non-autonomous manner. In these instances, and upon authenticating the tow truck driver or the other party, the tow truck driver or the other party may not only be granted access to a cabin of vehicle, but may also be granted access (e.g., limited access or full access) to control operation of vehicle 100 (e.g., to shift gear(s) of vehicle 100, to drive vehicle 100, etc.) and/or to engage in other communications with other parties (e.g., communications with a first-party dispatcher that dispatched vehicle 100, a first-party teleassistant operator capable of controlling vehicle 100, and so on).

Moreover, while certain non-limiting examples are described with respect to FIGS. 8A-8B are depicted, it should be understood that many other scenarios are contemplated herein. For instance, the local communication participant could be a law enforcement officer or another public safety official. In these instances, and upon authenticating the law enforcement officer or other public safety official, access could be granted to particular components of vehicle 100, additional communications could be made available to the law enforcement officer or other public safety official (e.g., communications with a first-party dispatcher that dispatched vehicle 100, a first-party teleassistant operator capable of controlling vehicle 100, and so on). In implementations where the additional communications are made available to the law enforcement officer or other public safety official, these communications can be conducted via a computing device of vehicle 100 or a computing device of the law enforcement officer or other public safety official. Also, for instance, the local communication participant could be a tow truck driver or other party that needs to move vehicle 100 in a non-autonomous manner. In these instances, and upon authenticating the tow truck driver or the other party, the tow truck driver or the other party may not only be granted access to a cabin of vehicle, but may also be granted access (e.g., limited access or full access) to control operation of vehicle 100 (e.g., to shift gear(s) of vehicle 100, to drive vehicle 100, etc.) and/or to engage in other communications with other parties (e.g., communications with a first-party dispatcher that dispatched vehicle 100, a first-party teleassistant operator capable of controlling vehicle 100, and so on).

It will be appreciated that, while certain features may be discussed herein in connection with certain implementations and/or in connection with certain figures, unless expressly stated to the contrary, such features generally may be incorporated into any of the implementations discussed and illustrated herein. Moreover, features that are disclosed as being combined in some implementations may generally be implemented separately in other implementations, and features that are disclosed as being implemented separately in some implementations may be combined in other implementations, so the fact that a particular feature is discussed in the context of one implementation but not another should not be construed as an admission that those two implementations are mutually exclusive of one another. Other variations will be apparent to those of ordinary skill.

What is claimed is:

1. A method implemented by one or more processors, the method comprising:
   monitoring sensor data associated with an autonomous vehicle or an environment of the autonomous vehicle, the sensor data being generated by one or more sensors of the autonomous vehicle;
   determining, based on an instance of the sensor data, whether to initiate a conversation with a remote communication participant that is located remotely from the autonomous vehicle;
   determining a type of the instance of the sensor data, the type of the instance of the sensor data being one of multiple disparate types of instances of the sensor data;
   identifying, based on the type of the instance of the sensor data, the remote communication participant that is located remotely from the autonomous vehicle; and
   in response to determining to initiate the conversation with the remote communication participant that is located remotely from the autonomous vehicle and based on the instance of the sensor data:
      initiating the conversation with the remote communication participant; and
      conducting the conversation with the remote communication participant, wherein conducting the conversation with the remote communication participant comprises:
         processing, using a generative model, generative model input to generate generative model output, the generative model input including at least an indication of the instance of the sensor data;
         determining, based on the generative model output, content to be rendered as part of the conversation with the remote communication participant; and
         causing the content to be rendered at a computing device associated with the remote communication participant.

2. The method of claim 1, wherein the type of the instance of the sensor data is a first type of sensor data, and wherein the remote communication participant is a dispatcher associated with the autonomous vehicle.

3. The method of claim 1, wherein the type of the instance of the sensor data is a second type of sensor data, and wherein the remote communication participant is a teleassist operator associated with the autonomous vehicle.

4. The method of claim 1, wherein the autonomous vehicle is an autonomous tractor-trailer, wherein the type of the instance of the sensor data is a third type of sensor data, and wherein the remote communication participant is a shipper associated with a payload of a trailer of the autonomous tractor-trailer.

5. The method of claim 1, wherein the autonomous vehicle is an autonomous tractor-trailer, wherein the type of the instance of the sensor data is a fourth type of sensor data, and wherein the remote communication participant is a carrier associated with a trailer of the autonomous tractor-trailer.

6. The method of claim 1, wherein initiating the conversation with the remote communication participant comprises:
   obtaining a telephone number associated with the remote communication participant; and
   initiating, based on the telephone number associated with the remote communication participant, a telephone call with the remote communication participant over a telephonic network.

7. The method of claim 1, wherein conducting the conversation with the remote communication participant further comprises:
   receiving audio data that captures additional content spoken by the remote communication participant, the audio data being generated by one or more microphones of the computing device associated with the remote communication participant;
   processing, using the generative model, additional generative model input to generate additional generative model output, the additional generative model input including at least an indication of the additional content spoken by the remote communication participant;
   determining, based on the additional generative model output, further additional content to be rendered as part of the conversation with the remote communication participant; and
   causing the further additional content to be rendered at the computing device associated with the remote communication participant.

8. The method of claim 7, further comprising:
   determining, based on the additional content spoken by the remote communication participant, whether to obtain contextual autonomous vehicle data for utilization in generating the further additional content; and
   in response to determining to obtain the contextual autonomous vehicle data for utilization in generating the further additional content:
      obtaining, from one or more structured databases that include structured data, the contextual autonomous vehicle data.

9. The method of claim 8, wherein the structured data is previously generated based on one or more of: historical driving logs of the autonomous vehicle or one or more additional autonomous vehicles in a fleet of autonomous vehicles along with at least the autonomous vehicle, historical conversation logs associated with the remote communication participant, historical sensor data generated by the one or more sensors of the autonomous vehicle or one or more of the additional autonomous vehicles, and historical maintenance data associated with the autonomous vehicle or one or more of the additional autonomous vehicles.

10. The method of claim 8, wherein the additional generative model input further includes the contextual autonomous vehicle data.

11. The method of claim 1, further comprising:
   in response to determining to refrain from initiating the conversation with the remote communication participant that is located remotely from the autonomous vehicle and based on the instance of the sensor data:
      continuing monitoring of the sensor data associated with the autonomous vehicle.

12. The method of claim 11, further comprising:
   determining, based on an additional instance of the sensor data that is in addition to the instance of sensor, whether to initiate a conversation with a remote communication participant that is located remotely from the autonomous vehicle; and in response to determining to initiate the conversation with the remote communication participant that is located remotely from the autonomous vehicle and based on the additional instance of the sensor data:
initiating the conversation with the remote communication participant; and
conducting the conversation with the remote communication participant, wherein conducting the conversation with the remote communication participant comprises:
processing, using a generative model, generative model input to generate generative model output, the generative model input including at least an indication of the instance of the sensor data;
determining, based on the generative model output, content to be rendered as part of the conversation with the remote communication participant; and
causing the content to be rendered at a computing device associated with the remote communication participant.

13. The method of claim 1, wherein the one or more processors are local to the autonomous vehicle.

14. The method of claim 13, wherein corresponding instances of the sensor data are monitored as they are generated by the one or more sensors of the autonomous vehicle.

15. The method of claim 1, wherein the one or more processors are located remotely from the autonomous vehicle, and wherein the one or more processors are located remotely from the computing device associated with the remote communication participant.

16. The method of claim 15, wherein monitoring the sensor data associated with the autonomous vehicle or the environment of the autonomous vehicle comprises:
receiving, over one or more networks, corresponding instances of the sensor data,
wherein the corresponding instances of the sensor data are generated at a first rate, and
wherein the corresponding instances of the sensor data are received at a second rate that differs from the first rate.

17. The method of claim 1, further comprising:
determining a result of the conversation with the remote communication participant;
determining, based on the result of the conversation with the remote communication participant, whether to initiate an additional conversation with an additional remote communication participant that is located remotely from the autonomous vehicle; and
in response to determining to initiate an additional conversation with an additional remote communication participant that is located remotely from the autonomous vehicle:
initiating the additional conversation with the additional remote communication participant; and
conducting the additional conversation with the additional remote communication participant, wherein conducting the additional conversation with the additional remote communication participant comprises:
processing, using the generative model, additional generative model input to generate additional generative model output, the additional generative model input including at least an indication of the result of the conversation with the remote communication participant;
determining, based on the additional generative model output, additional content to be rendered as part of the additional conversation with the additional remote communication participant; and
causing the additional content to be rendered at an additional computing device associated with the additional remote communication participant.

18. The method of claim 1, wherein causing the content to be rendered at the computing device associated with the remote communication participant comprises:
causing the content to be audibly rendered via one or more speaker components of the computing device associated with the remote communication participant.

19. The method of claim 1, wherein causing the content to be rendered at the computing device associated with the remote communication participant comprises:
causing the content to be visually rendered via a display of the computing device associated with the remote communication participant.

20. The method of claim 1, further comprising:
determining, based on the instance of the sensor data, one or more structured database queries to obtain contextual autonomous vehicle data; and
obtaining, from one or more structured databases that include structured data, and based on the one or more structured database queries, the contextual autonomous vehicle data,
wherein the generative model input further includes the contextual autonomous vehicle data.

21. The method of claim 20, wherein determining the one or more structured database queries to obtain the contextual autonomous vehicle data is in response to determining to initiate the conversation with the remote communication participant that is located remotely from the autonomous vehicle and based on the instance of the sensor data.

22. The method of claim 1, wherein the generative model input further includes contextual autonomous vehicle data that is specific to the autonomous vehicle, and wherein the contextual autonomous vehicle data that is specific to the autonomous vehicle comprises one or more of: conversation logs associated with the autonomous vehicle, historical sensor data associated with the autonomous vehicle, maintenance logs associated with the autonomous vehicle, event logs associated with the autonomous vehicle, dispatch records associated with the autonomous vehicle; or operational logs associated with the autonomous vehicle.

23. The method of claim 22, wherein the contextual autonomous vehicle data is obtained prior to determining to initiate the conversation with the remote communication participant that is located remotely from the autonomous vehicle and based on the instance of the sensor data.

24. The method of claim 22, wherein the contextual autonomous vehicle data is specific to the autonomous vehicle for a current episode of locomotion of the autonomous vehicle.

25. A system comprising:
at least one processor; and
memory storing instructions that, when executed, cause the at least one processor to be operable to:
monitor sensor data associated with an autonomous vehicle or an environment of the autonomous vehicle, the sensor data being generated by one or more sensors of the autonomous vehicle;
determine, based on an instance of the sensor data, whether to initiate a conversation with a remote communication participant that is located remotely from the autonomous vehicle;

in response to determining to initiate the conversation with the remote communication participant that is located remotely from the autonomous vehicle and based on the instance of the sensor data:
  initiate the conversation with the remote communication participant; and
  conduct the conversation with the remote communication participant, wherein the instructions to conduct the conversation with the remote communication participant comprise instructions to:
    process, using a generative model, generative model input to generate generative model output, the generative model input including at least an indication of the instance of the sensor data;
    determine, based on the generative model output, content to be rendered as part of the conversation with the remote communication participant; and
    cause the content to be rendered at a computing device associated with the remote communication participant;
determine a result of the conversation with the remote communication participant;
determine, based on the result of the conversation with the remote communication participant, whether to initiate an additional conversation with an additional remote communication participant that is located remotely from the autonomous vehicle; and
in response to determining to initiate an additional conversation with an additional remote communication participant that is located remotely from the autonomous vehicle:
  initiate the additional conversation with the additional remote communication participant; and
  conduct the additional conversation with the additional remote communication participant, wherein the instructions to conduct the additional conversation with the additional remote communication participant comprise instructions:
    process, using the generative model, additional generative model input to generate additional generative model output, the additional generative model input including at least an indication of the result of the conversation with the remote communication participant;
    determine, based on the additional generative model output, additional content to be rendered as part of the additional conversation with the additional remote communication participant; and
    cause the additional content to be rendered at an additional computing device associated with the additional remote communication participant.

26. The system of claim 25, wherein the at least one processor is further operable to:
  determine a type of the instance of the sensor data, the type of the instance of the sensor data being one of multiple disparate types of instances of the sensor data;
  identify, based on the type of the instance of the sensor data, the remote communication participant that is located remotely from the autonomous vehicle.

27. A non-transitory computer-readable storage medium storing instructions that, when executed by at least one processor, cause the at least one processor to execute the instructions to:
  monitor sensor data associated with an autonomous vehicle or an environment of the autonomous vehicle, the sensor data being generated by one or more sensors of the autonomous vehicle;
  determine, based on an instance of the sensor data, whether to initiate a conversation with a remote communication participant that is located remotely from the autonomous vehicle;
  determine a type of the instance of the sensor data, the type of the instance of the sensor data being one of multiple disparate types of instances of the sensor data;
  identify, based on the type of the instance of the sensor data, the remote communication participant that is located remotely from the autonomous vehicle; and
  in response to determining to initiate the conversation with the remote communication participant that is located remotely from the autonomous vehicle and based on the instance of the sensor data:
    initiate the conversation with the remote communication participant; and
    conduct the conversation with the remote communication participant, wherein the instructions to conduct the conversation with the remote communication participant comprise instructions to:
      process, using a generative model, generative model input to generate generative model output, the generative model input including at least an indication of the instance of the sensor data;
      determine, based on the generative model output, content to be rendered as part of the conversation with the remote communication participant; and
      cause the content to be rendered at a computing device associated with the remote communication participant.

* * * * *